(12) United States Patent
Salodkar et al.

(10) Patent No.: US 10,997,800 B1
(45) Date of Patent: May 4, 2021

(54) METHOD AND SYSTEM FOR VEHICULAR COLLISION RECONSTRUCTION

(71) Applicant: Zendrive, Inc., San Francisco, CA (US)

(72) Inventors: Nitin Dileep Salodkar, San Francisco, CA (US); Nikhil Mudaliar, San Francisco, CA (US); Jayanta Kumar Pal, San Francisco, CA (US); Pankaj Risbood, San Francisco, CA (US); Jonathan Matus, San Francisco, CA (US)

(73) Assignee: Zendrive, Inc., San Francisco, CA (US)

( * ) Notice: Subject to any disclaimer, the term of this patent is extended or adjusted under 35 U.S.C. 154(b) by 0 days.

(21) Appl. No.: 17/155,939

(22) Filed: Jan. 22, 2021

Related U.S. Application Data

(60) Provisional application No. 62/964,559, filed on Jan. 22, 2020.

(51) Int. Cl.
| | |
|---|---|
| *G07C 5/00* | (2006.01) |
| *G06N 20/00* | (2019.01) |
| *G07C 5/08* | (2006.01) |
| *G06Q 40/08* | (2012.01) |
| *G06K 9/62* | (2006.01) |

(52) U.S. Cl.
CPC ............ *G07C 5/008* (2013.01); *G06N 20/00* (2019.01); *G06Q 40/08* (2013.01); *G07C 5/0808* (2013.01); *G07C 5/0841* (2013.01); *G06K 9/6257* (2013.01)

(58) Field of Classification Search
CPC ........................ B60N 2002/0272; H04W 4/027
USPC ..................................... 455/39, 456.4, 456.3
See application file for complete search history.

(56) References Cited

U.S. PATENT DOCUMENTS

| | | |
|---|---|---|
| 10,347,111 B1 | 7/2019 | Hollenstain et al. |
| 10,387,962 B1 | 8/2019 | Potter et al. |
| 2014/0309885 A1* | 10/2014 | Ricci ................. B60H 1/00742 701/41 |
| 2014/0335902 A1* | 11/2014 | Guba ..................... H04W 48/04 455/456.4 |
| 2018/0003593 A1* | 1/2018 | Siegel .................... G01H 17/00 |

FOREIGN PATENT DOCUMENTS

| | | |
|---|---|---|
| CA | 2842332 A1 | 1/2013 |
| WO | 2020018435 A1 | 1/2020 |

OTHER PUBLICATIONS

"Cambridge Mobile Telematics :Claims Studio: Reconstruct and Detect Crashes", Jan. 3, 2020, blog.

* cited by examiner

*Primary Examiner* — Kiet M Doan
(74) *Attorney, Agent, or Firm* — Jeffrey Schox; Caitlin Ploch

(57) ABSTRACT

A system for accident reconstruction can include and/or be configured to interface with any or all of: a set of models, a set of modules, a processing system, client application, a user device (equivalently referred to herein as a mobile device), a set of sensors, a vehicle, and/or any other suitable components. A method for accident reconstruction includes collecting a set of inputs; detecting a collision and/or one or more features of the collision; reconstructing the collision; and producing an output based on the reconstruction. Additionally or alternatively, the method can include training a set of models and/or modules, and/or any other suitable processes.

9 Claims, 17 Drawing Sheets

Close up of impulse direction and auxiliary information

Impulse Direction

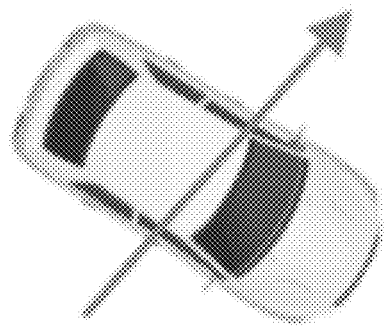

| | |
|---|---|
| Date & Time | Saturday, September 22, 2018 3:15 PM |
| Direction of Motion | SE |
| Lat, Long | 33.1685, -117.2491 |
| Address | 1521 Carmel Mountain Rd, Vista, CA 92081, USA |
| Speed | 47.8951 |
| Posted Speed Limit | 40 mph |
| G Force | 9.2045 |
| Deceleration | -6.7291 miles per hour/second |
| Road Type | secondary |
| Number of seconds stopped | 948.308 |
| Brake Distance | 343.4584 meters |

The first impulse peak shows the initial collision impact. Subsequent impulses can indicate secondary collisions, or the phone being thrown inside the vehicle during and after a collision

FIGURE 9G

METHOD AND SYSTEM FOR VEHICULAR COLLISION RECONSTRUCTION

CROSS-REFERENCE TO RELATED APPLICATIONS

This application claims the benefit of U.S. Provisional Application No. 62/964,559, filed 22 Jan. 2020, which is incorporated in its entirety by this reference.

TECHNICAL FIELD

This invention relates generally to the vehicle telematics field, and more specifically to a new and useful system and method for collision reconstruction in the vehicle telematics field.

BACKGROUND

In the event of a vehicular accident, a conventional action—in constructing an insurance claim, for instance—is to reconstruct the accident in order to determine such information as who and/or what is at fault as well as the extent of the damage.

Conventional methods for accident reconstruction are performed completely or nearly completely manually, and often with a very limited, unreliable, and/or inconsistent set of information. The most useful information with which to accurately and objectively assess the accident is currently conventionally unavailable to those reconstructing the accident, and even if a portion is available, it is difficult to collect and assess. Furthermore, the overall accident reconstruction process is conventionally slow and tedious, made up of highly manual, human-centric processes.

In a variation of a conventional accident reconstruction process (e.g., as shown in FIG. 8A), for instance, the process starts with an insurance company receiving a claim in response to the occurrence of an accident. Often days later, the driver is contacted, and an investigation into the factors involved in the accident (e.g., the involvement of another vehicle, the involvement of a pedestrian, towing of a vehicle, police involvement, etc.) begins, often when relevant and/or helpful information is already forgotten, now biased, or otherwise less reliable. A first notice of loss (equivalently referred to herein as a first notification of loss) is then produced, which assesses the overall magnitude and/or type of damage resulting from the accident. In an event that the accident only involves property loss, a trip to an auto body is prompted. In an event that the accident analysis is more complex, an investigation into potential fraud, manipulation of memory, and/or other causes for inaccurate information may be prompted. These investigations, however—in addition to being slow—are most often not precise and can be heavily biased as well as slow moving.

Thus, there is a need in the vehicle telematics field to create an improved and useful system and method for reconstructing vehicular accidents.

BRIEF DESCRIPTION OF THE FIGURES

FIGS. 9A-9G depict a variation of a collision reconstruction dashboard (e.g., as produced in S230).

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 2:
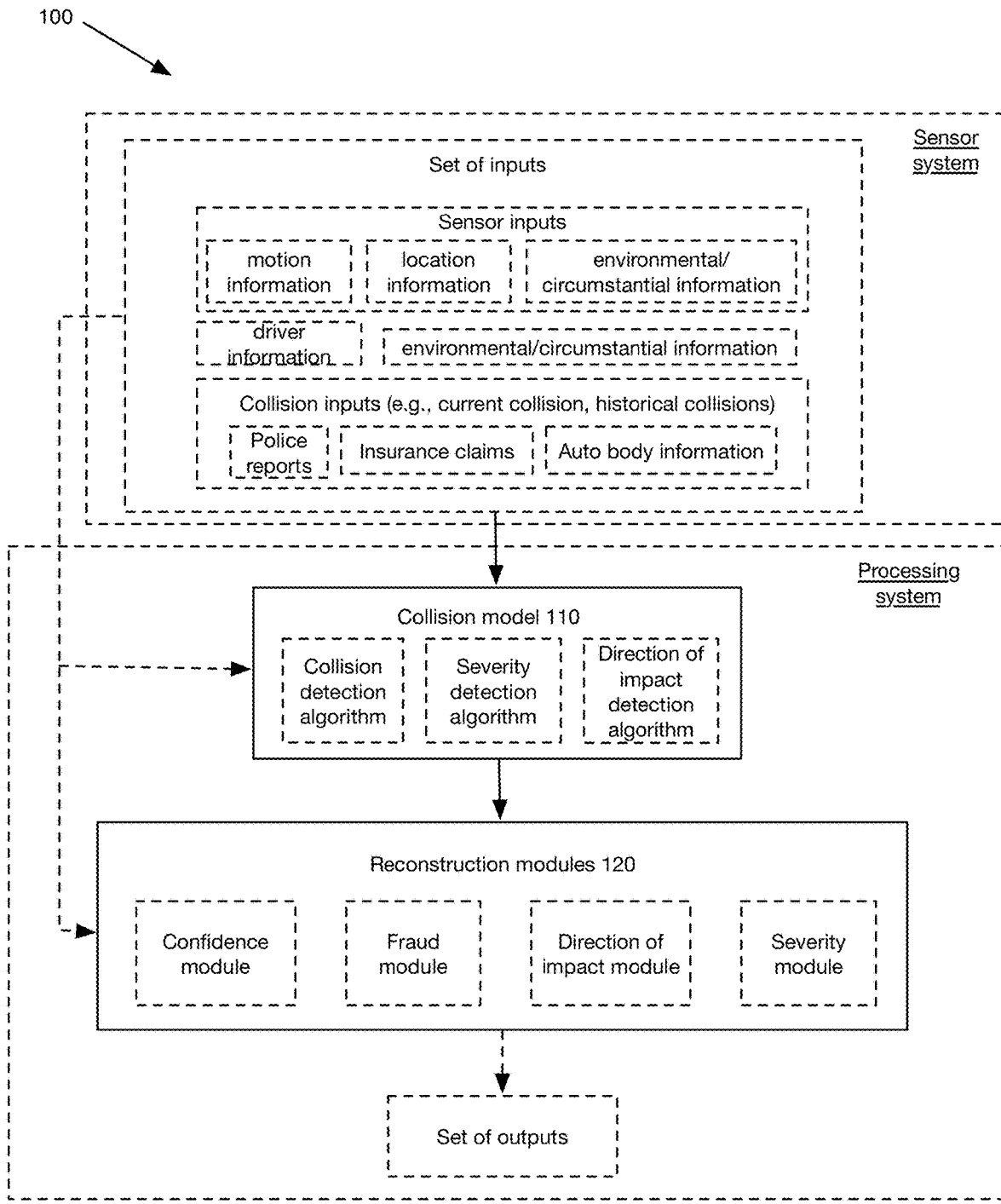
FIG. 2 is a schematic representation of a set of models and modules used in detecting and/or reconstructing a collision.

As shown in FIG. 2, a system 100 for accident reconstruction can include and/or be configured to interface with any or all of: a set of models, a set of modules, a processing system, client application, a user device (equivalently referred to herein as a mobile device), a set of sensors, a vehicle, and/or any other suitable components.

The system can additionally or alternatively include any or all of the systems, components, embodiments, and examples described in any or all of: U.S. application Ser. No. 15/243,565, filed 22 Aug. 2016; U.S. application Ser. No. 14/566,408, filed 10 Dec. 2014; U.S. application Ser. No. 14/206,721, filed 12 Mar. 2014; and U.S. application Ser. No. 17/111,299, filed 3 Dec. 2020, each of which is incorporated herein in its entirety by this reference.

Figure 1:
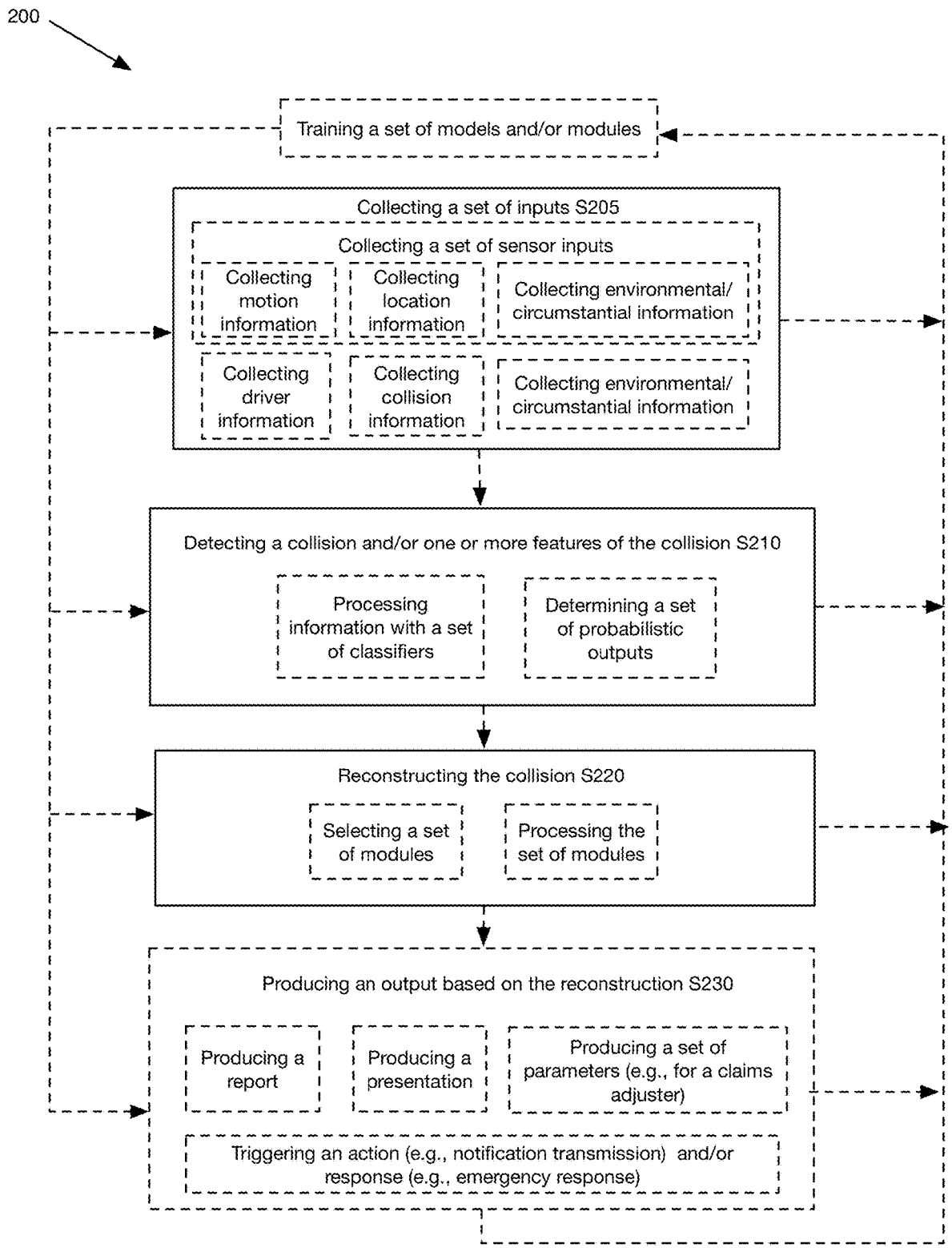
FIG. 1 is a schematic representation of a method for collision reconstruction.

As shown in FIG. 1, the method 200 for accident reconstruction includes collecting a set of inputs S205; detecting a collision and/or one or more features of the collision S210; reconstructing the collision S220; and producing an output based on the reconstruction S230. Additionally or alternatively, the method 200 can include training a set of models and/or modules, and/or any other suitable processes.

Further additionally or alternatively, the method 200 can include any other suitable processes and/or any or all of the methods, processes, embodiments, and examples described in any or all of: U.S. application Ser. No. 15/243,565, filed 22 Aug. 2016; and U.S. application Ser. No. 14/566,408, filed 10 Dec. 2014; U.S. application Ser. No. 15/702,601, filed 12 Sep. 2017; U.S. application Ser. No. 15/835,284, filed 7 Dec. 2017; U.S. application Ser. No. 15/401,761, filed 9 Jan. 2017; U.S. application Ser. No. 16/022,120, filed 28 Jun. 2018; U.S. application Ser. No. 16/022,184, filed 28 Jun. 2018; U.S. application Ser. No. 16/166,895, filed 22 Oct. 2018; U.S. application Ser. No. 16/201,955, filed 27 Nov. 2018; U.S. application Ser. No. 17/700,991, filed 2 Dec. 2019; U.S. application Ser. No. 14/206,721, filed 12 Mar. 2014; and U.S. application Ser. No. 17/111,299, filed 3 Dec. 2020, each of which is hereby incorporated in its entirety by this reference.

The method 200 is preferably performed with a system 100 as described above, but can additionally or alternatively be performed with any other suitable system(s).

2. Benefits

The system and method for collision reconstruction can confer several benefits over current systems and methods.

First, in some variations, the system and/or method confers the benefit of easily and promptly accessing reliable and relevant information associated with a vehicular accident. In specific examples, for instance, the system and method leverage any or all of the following information associated with one or more vehicles involved in an accident and collected, at least partially, at a mobile device to make a quantitative assessment of the vehicular accident: location information, motion information, driver information, passenger information, circumstantial information, and/or any other suitable information. This can further function to remove or minimize the use of unreliable human accounts in the reconstruction of an accident. Additionally or alternatively, any or all of the information can be used to trigger a response and/or action to help a driver involved in a collision, such as a life-saving response (e.g., notifying emergency services, notifying the police, etc.), assistance in performing one or more tasks and/or eliminating one or more tasks typically required to be performed by the driver (e.g., by completing and/or assisting in and/or eliminating paperwork required by the driver's insurance company, by automatically recommending and/or contacting a body shop in response to a collision, etc.), and/or performing any other suitable functions.

Second, in some variations, additional or alternative to the first, the system and/or method confers the benefit of decreasing the time required to reconstruct an accident and subsequently the time required to produce one or more outputs (e.g., insurance claim, auto body work approval, etc.) associated with an accident. In specific examples, for instance, information associated with the accident is collected in real time or near real time (e.g., within seconds, within less than a minute, within less than an hour, etc.) from a mobile device associated with the accident (e.g., a driver's mobile phone), and used to at least partially assess the accident.

Third, in some variations, additional or alternative to those described above, the system and/or method confers the benefit of producing an accurate, easily interpretable output reconstructing the accident. In specific examples, for instance, the method produces an easy intelligible user interface (e.g., at a client application) and/or set of materials (e.g., slide deck, visuals, reports, etc.) with which insurance companies can view one or more parameters (e.g., G-forces, speeds, etc.) associated with an accident. Additionally or alternatively, the system and/or method can determine and/or autofill one or more sections of an insurance report, determine and/or autofill any or all of a claim adjustment, determine and transmit a set of parameters associated with the collision (e.g., as determined by a model and/or set of modules as described below) to an insurance entity, and/or can perform any other suitable functions.

Fourth, in some variations, additional or alternative to those described above, the system and/or method confers the benefit of partially or fully automating one or more processes related to collision detection and/or reconstruction. In preferred variations, for instance, the method is partially or fully implemented with artificial intelligence (e.g., machine learning and/or deep learning models, with machine learning and/or deep learning modules, etc.). Additionally, the system and/or method can function to continue to learn (e.g., be continuously retrained) from the continuously detected telematic data collected from drivers. In specific examples, the model used to process telematic information (and optionally other information), implements both traditional machine learning and deep learning processing, which improves performance of the model in automatically producing one or more parameters associated with the collision. In specific examples, the system and/or method confers the benefit of automatically initiating, performing, and/or verifying an insurance claim in response to a collision.

Additionally or alternatively, the system and method can confer any other suitable benefit(s).

3. System 100

A system 100 for accident reconstruction can include and/or be configured to interface with any or all of: a set of models, a set of modules, a processing system, client application, a user device (equivalently referred to herein as a mobile device), a set of sensors, a vehicle, and/or any other suitable components.

The system can additionally or alternatively include any or all of the systems, components, embodiments, and examples described in any or all of: U.S. application Ser. No. 15/243,565, filed 22 Aug. 2016; U.S. application Ser. No. 14/566,408, filed 10 Dec. 2014; U.S. application Ser. No. 14/206,721, filed 12 Mar. 2014; and U.S. application Ser. No. 17/111,299, filed 3 Dec. 2020, each of which is incorporated herein in its entirety by this reference.

The system 100 preferably includes a set of one or more models no, wherein the set of models includes a collision model, wherein the collision model functions to assess (e.g., detect, classify, etc.) the occurrence of a collision (e.g., a suspected collision based on a set of inputs as described in the method below), and to optionally assess (e.g., detect, check for, determine a likelihood of, assign a probability to, etc.) one or more features associated with the collision. The collision model and/or any other models can additionally or alternatively function to determine a set of probabilistic outputs related to a collision and/or features of a collision, organize and/or label data from the set of inputs (e.g., to identify the most relevant data for further analysis), determine a set of parameters associated with a set of inputs (e.g., speed of vehicle just before collision, acceleration of vehicle before and/or during and/or after a collision, GPS coordinates associated with the vehicle before and/or during and/or after a collision, etc.), initiate one or more actions (e.g., notifications, emergency responses, etc.) in response to the model outputs, and/or can perform any other suitable functions.

The set of features assessed can include, but is not limited to, any or all of: a severity of the collision (e.g., relative to the driver, relative to the vehicle, relative to other vehicles involved, etc.), a direction of impact (e.g., frontal impact, rear impact, broad side, side swipe, rollover, etc.) of the vehicle involved in the collision, a location of impact (e.g., bumper, fender, passenger side door, driver side door, rear windshield, etc.), airbag deployment, the presence and/or absence of passengers (e.g., and/or number of passengers) within the vehicle, and/or any other suitable features (e.g., a number of vehicles involved in the collision). Additionally or alternatively, any or all of these features (and/or any other features) can be assessed in the set of modules described below, and/or with any other components of the system. In preferred variations, the collision model functions to produce outputs (e.g., probabilistic outputs, classifications, etc.) related to: whether or not a collision has occurred, a severity associated with the collision (e.g., "severe" vs. "not severe", "fatality" vs. "no fatality", a type of severity, etc.), and a direction of impact (e.g., frontal, rear, broad side, side swipe, rollover) (equivalently referred to herein as a type of impact). Additionally or alternatively, any other features can be investigated.

The collision model and/or any other suitable models of a set of models preferably includes one or more algorithms (e.g., machine learning algorithms, deep learning algorithms, etc.), wherein any or all of the algorithms further preferably implement one or more machine learning processes (e.g., traditional "non-deep-learning" machine learning, deep learning, etc.).

In preferred variations, the machine learning processes include both traditional machine learning and deep learning processes, wherein traditional machine learning refers to models absent of the many hidden layers of the deep learning processes such as deep neural networks. This combination can function, for instance, to improve performance of the classification with respect to any or all of: accuracy of the classifications, computing resources and/or time required to determine the classifications, and/or can otherwise improve performance and/or confer any other advantages. In specific examples, the traditional machine learning processes implement zero hidden layers, but can additionally or alternatively implement non-zero hidden layers, such as a number of hidden layers less than a threshold number (e.g., 2, 3, 4, 5, 10, 20, between 2 and 10, between 10 and 20, greater than 20, etc.) and/or be otherwise defined. The deep learning is preferably implemented with one or more neural networks (e.g., deep neural networks [DNNs], convolutional neural networks [CNNs], recursive neural networks [RNNs], reinforcement learning [RL], inverse reinforcement learning [IRL], etc.), but can additionally or alternatively be implemented with any other deep learning architectures.

In additional or alternative variations, the machine learning processes can include only traditional machine learning, only deep learning, and/or any other types of artificial intelligence.

In further additional or alternative variations, any or all of the models can implement non-machine-learning processes, such as classical processes (e.g., rule-based algorithms, dynamic equations to determine one or more motion characteristics of the vehicle, etc.).

In yet further additional or alternative variations, any or all of the models can include and/or interface with any or all of the systems, components, embodiments, and/or examples described in U.S. application Ser. No. 15/243,565, filed 22 Aug. 2016, which is incorporated herein in its entirety by this reference. In specific examples, for instance, the collision detection algorithm of the collision model can be implemented according to the embodiments described in this Application. Additionally or alternatively, any or all of the processes in this Application can be implemented prior to the model 110, such as to initially detect a suspected collision (and/or identify the data related to the suspected collision), which is further processed in the collision model no.

Figure 3:
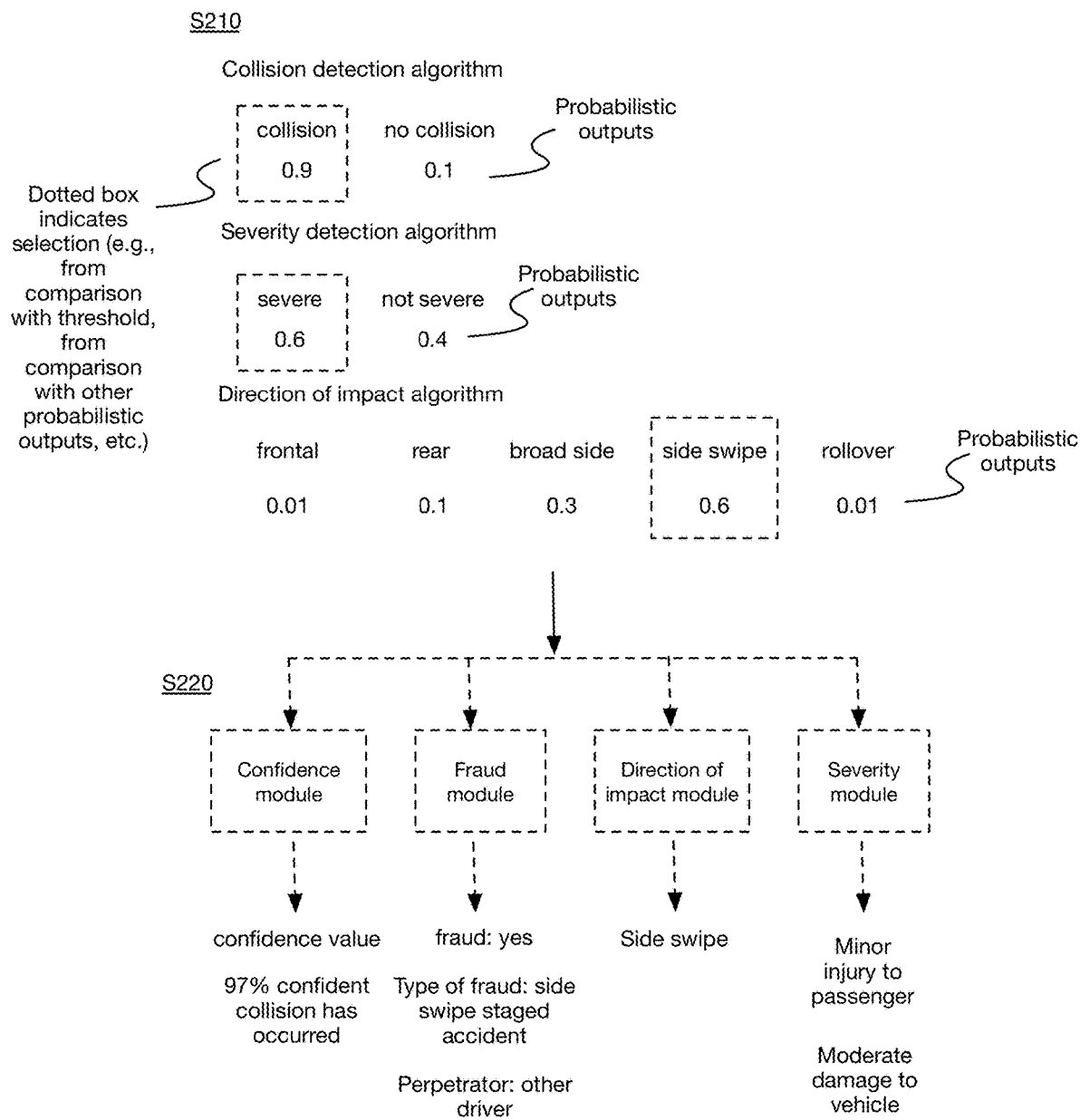
FIG. 3 depicts an example for illustrative purposes of a set of probabilistic outputs produced by a set of classifiers and a set outputs used to reconstruct a collision produced by a set of modules.

The set of algorithms of the model(s) preferably function to classify the set of inputs relative to any or all of the categories (e.g., collision vs. no collision, collision features, etc.) described above. As such, the set of algorithms preferably includes one or more classification algorithms (equivalently referred to herein as classifiers), wherein the algorithms are configured to determine classifications for the set of inputs. The classifications (outputs of the classification algorithms) can be in the form of any or all of: probabilities (e.g., relative to a set of binary classes, relative to a set of non-binary classes, as shown in FIG. 3, etc.), labels, labeled data, and/or any other formats. In a preferred set of variations, the classification algorithms implement gradient boosting, such as through a set of gradient boosting machines. Additionally or alternatively, the model(s) can implement any other classification algorithms, such as but not limited to, any or all of: k-nearest neighbor, case-based reasoning, decision tree, naive Bayes, artificial neural networks, and/or any other algorithms. In specific examples, the algorithms implement both traditional machine learning and deep learning processes, wherein the traditional machine learning techniques include one or more gradient boosting machines.

Additionally or alternatively, classification(s) can be performed with one or more classical (e.g., classically programmed, rule-based, etc.) approaches.

Further additionally or alternatively, the set of algorithms can include any other suitable algorithms configured for classification or purposes other than classification, such as any or all of: equations, decision trees, lookup tables, and/or any other suitable components or processes. In some variations, for instance, any or all of the models 110 function to determine auxiliary information related to driver and/or the vehicle, such as, but not limited to, any or all of: motion parameters of the vehicle such as a speed (e.g., speed, speed just before the collision, speed during collision, speed just after collision, average speed during trip, etc.), acceleration (e.g., G-force associated with the vehicle), distance (e.g., braking distance), etc.; historical information (e.g., driver's driving history, number of collisions driver has been involved in, driving style and/or behaviors of driver, etc.); driver information (e.g., risk score assigned to driver); circumstantial/environmental information (e.g., time of day at which collision occurred, region in which collision occurred such as school zone vs. residential zone vs. highway, traffic conditions at time of collision, weather conditions at time of collision, road features and/or landmarks such as potholes, etc.); and/or any other suitable auxiliary information.

In a first set of variations, the collision model no includes a set of classifiers configured to determine a set of probabilistic outputs related to the collision and optionally one or more features of the collision. In specific examples, the set of classifiers includes a collision detection classifier configured to determine a probability that a collision has occurred, a probability that the collision is severe, and a probability associated with a direction of impact of the vehicle (e.g., probability associated with each possible direction of impact, direction of impact associated with the highest probability, etc.).

In a second set of variations, the collision model 110 includes a set of classifiers configured to determine a set of class labels related to the collision and optionally one or more features of the collision. In specific examples, the set of classifiers includes a collision detection classifier configured to determine a yes/no determination that a collision has occurred, a label indicating whether the collision was severe or not severe, and a label identifying the particular direction or directions of impact on the vehicle.

The system preferably includes a set of reconstruction modules 120, wherein the set of reconstruction modules functions to produce outputs for use by various different entities in reconstructing and/or understanding various potential aspects of the collision. These entities preferably include one or more insurance entities (e.g., insurance company associated with the driver and/or other passengers, insurance company associated with the driver of any vehicle involved in the collision, insurance agent, etc.), but can additionally or alternatively include the driver, individuals associated with the driver (e.g., family members), and/or any other suitable entities.

Additionally or alternatively, the reconstruction modules can function to create and/or autofill a portion or all of one or more documents (e.g., insurance claims, accident reports, etc.), facilitate communication to and/or between entities (e.g., automatically notify an insurance entity of the collision such as through a first notice of loss [FNOL]), communicate with the driver to confirm a collision and/or offer assistance, automatically call 911 for assistance, etc.), trigger one or more response actions (e.g., as described above), perform any or all of the functions described above for the models 110, and/or can perform any other suitable functions.

The set of modules preferably includes multiple modules, wherein each of the multiple modules functions to reconstruct a portion (e.g., a feature) or all of the collision. In some variations, for instance, the set of modules includes modules configured to detect any or all of: a confidence associated with the occurrence of a collision, a severity of the collision, a direction of impact of the vehicle, fraud involved in the collision, and/or the set of modules can be configured to detect any other suitable information related to the collision.

The modules can include any or all of: machine learning models and/or algorithms (e.g., traditional machine learning models, deep learning models, any or all of those described above, etc.); classical models (e.g., rule-based algorithms, decision trees, lookup tables, mappings, etc.); other models; and/or any combination of models. For modules including machine learning approaches, the modules preferably include regression models, but can additionally or alternatively include classifiers and/or any other suitable models.

In a first set of variations, the set of modules includes a $1^{st}$ subset and a $2^{nd}$ subset, wherein the $1^{st}$ subset includes machine learning regression models and wherein the second subset includes rule-based algorithms. In specific examples, the $1^{st}$ subset of modules includes any or all of: a confidence detection module, a direction of impact module, and a severity detection module, and wherein the $2^{nd}$ subset includes a fraud detection module.

Additionally or alternatively, the set of modules can include only machine learning regression models, only rule-based algorithms, other models and/or algorithms, and/or any combination.

The system can include and/or interface with a processing system, which functions to receive and process any or all of the information (e.g., the set of inputs described below) associated with the accident (equivalently referred to herein as a collision). In some variations, for instance, the processing system is involved in any or all of: receiving a movement dataset collected during a time period of vehicle movement; extracting a set of movement features associated with at least one of a position, a velocity, and an acceleration characterizing the movement of the vehicle during the time period; detecting a vehicular accident event from processing the set of movement features with an accident detection model; determining an accident characteristic (e.g., severity); reconstructing the accident; and producing an output associated with the reconstruction. Additionally or alternatively, the processing system can perform any other suitable functions.

The processing system can be any or all of: associated with a single component, distributed among multiple components (e.g., mobile devices, mobile device and remote processing system, etc.), and/or any combination of these. At least a portion of the processing system is preferably arranged remotely (e.g., at a remote computing system and/or a cloud-based computing system), but can additionally or alternatively be arranged locally (e.g., onboard the vehicle), onboard one or more devices (e.g., mobile user devices), any combination, and/or otherwise arranged. In a first set of variations, for instance, the processing system is arranged remotely at a remote computing system, wherein the remote computing system is in communication with a user device associated with the user (e.g., the driver), wherein the remote computing system receives information from the user's user device (e.g., through an SDK operating on the user device). Additionally or alternatively, the processing system can include and/or interface with any other processing systems, such as those mounted to and/or within the vehicle, those of a vehicle's on-board diagnostics (OBD) system, and/or any other suitable processing systems.

Database(s) and/or portions of the method 200 can be entirely or partially executed, run, hosted, or otherwise performed by: a mobile computing device, a remote computing system (e.g., a server, at least one networked computing system, stateless computing system, stateful computing system, etc.), a machine configured to receive a computer-readable medium storing computer-readable instructions, or by any other suitable computing system possessing any suitable component (e.g., a graphics processing unit, a communications module, etc.). Mobile computing devices implementing at least a portion of the method 200 can include one or more of: a smartphone, a wearable computing device (e.g., head-mounted wearable computing device, a smart watch, smart glasses), tablet, desktop, a supplemental biosignal detector, a supplemental sensor (e.g., motion sensors, magnetometers, audio sensors, video sensors, location sensors a motion sensor, a light sensor, etc.), a medical device, and/or any other suitable device. All or portions of the method 200 can be performed by one or more of: a native application, web application, firmware on the device, plug-in, and any other suitable software executing on a device. Device components used with the method 200 can include an input (e.g., keyboard, touchscreen, etc.), an output (e.g., a display), a processor, a transceiver, and/or any other suitable component, where data from the input device (s) and/or output device(s) can be generated, analyzed, and/or transmitted to entities for consumption (e.g., for a user to assess their health parameters) Communication between devices and/or databases can include wireless communication (e.g., WiFi, Bluetooth, radiofrequency, etc.) and/or wired communication.

However, the components of the system can be distributed across machine and cloud-based computing systems in any other suitable manner.

The system is preferably configured to facilitate reception and processing of the data and information described below, but can additionally or alternatively be configured to receive and/or process any other suitable type of data. As such, the processing system can be implemented on one or more computing systems including one or more of: a cloud-based computing system (e.g., Amazon EC3), a mainframe computing system, a grid-computing system, and any other suitable computing system. Furthermore, reception of data by the processing system 205 can occur over a wired connection and/or wirelessly (e.g., over the Internet, directly from a natively application executing on an electronic device of the patient, indirectly from a remote database receiving data from a mobile computing device, etc.).

However, one or more mobile computing devices, vehicles, remote servers, and/or other suitable computing systems can be communicably connected (e.g., wired, wirelessly) through any suitable communication networks. For example, a non-generalized mobile computing device (e.g., smartphone including at least one of a location sensor and motion sensor, etc.) can be configured for any or all of: to collect a movement dataset, to receive additional movement datasets from the vehicle (e.g., OBD port) and/or other mobile computing devices (e.g., a wearable fitness tracker coupled to the driver's wrist), and to detect a vehicular accident event with the collected data, where the mobile computing device, the vehicle, and the other mobile computing devices are communicably connected through one or more wireless links (e.g., Bluetooth). In another example, a remote server can be configured to receive movement data from a vehicle and a mobile computing device, to detect a vehicular accident event based on the received data, and to automatically contact emergency services (e.g., through a telecommunications API), where the a remote server, vehicle, and mobile computing device are connected over a wireless network. However, the system can include any suitable configuration of non-generalized computing systems connected in any combination to one or more communication networks.

Components of the system and/or any suitable portion of the method 200 can employ machine learning approaches including any one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), any or all of the approaches described above, and any other suitable learning style. Each model and/or module can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the method 200 can additionally or alternatively leverage: a probabilistic module, heuristic module, deterministic module, or any other suitable module leveraging any other suitable computation method, machine learning method or combination thereof.

The method 200 and/or system 100 of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a patient computer or mobile device, or any suitable combination thereof. Other systems and methods of the embodiments can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, though any suitable dedicated hardware device can (alternatively or additionally) execute the instructions.

In a first variation of the system 100 for collision detection and/or reconstruction, the system 100 includes a set of collision models 110 and a set of reconstruction modules 120, wherein the set of collision models no and the set of reconstruction modules are implemented at a processing system arranged at least partially remotely, wherein the processing system is configured to receive telematic information (e.g., from a mobile device of the driver) with which to at least partially evaluate the models and/or modules.

Additionally or alternatively, the system 100 can include any other suitable components configured to perform any suitable part(s) of the method 200.

4. Method 200

As shown in FIG. 1, the method 200 for accident reconstruction includes collecting a set of inputs S205; detecting a collision and/or one or more features of the collision S210; reconstructing the collision S220; and producing an output based on the reconstruction S230. Additionally or alternatively, the method 200 can include training a set of models and/or modules, and/or any other suitable processes.

Further additionally or alternatively, the method 200 can include any other suitable processes and/or any or all of the methods, processes, embodiments, and examples described in any or all of: U.S. application Ser. No. 15/243,565, filed 22 Aug. 2016; and U.S. application Ser. No. 14/566,408, filed 10 Dec. 2014; U.S. application Ser. No. 15/702,601, filed 12 Sep. 2017; U.S. application Ser. No. 15/835,284, filed 7 Dec. 2017; U.S. application Ser. No. 15/401,761, filed 9 Jan. 2017; U.S. application Ser. No. 16/022,120, filed 28 Jun. 2018; U.S. application Ser. No. 16/022,184, filed 28 Jun. 2018; U.S. application Ser. No. 16/166,895, filed 22 Oct. 2018; U.S. application Ser. No. 16/201,955, filed 27 Nov. 2018; U.S. application Ser. No. 17/700,991, filed 2 Dec. 2019; U.S. application Ser. No. 14/206,721, filed 12 Mar. 2014; and U.S. application Ser. No. 17/111,299, filed 3 Dec. 2020, each of which is hereby incorporated in its entirety by this reference.

The method 200 is preferably performed with a system 100 as described above, but can additionally or alternatively be performed with any other suitable system(s).

The method 200 preferably functions to automatically detect and reconstruct a collision, but can additionally or alternatively function to produce one or more outputs in light of a collision, 4.1 Method: Collecting a Set of Inputs S205

The method 200 includes collecting a set of inputs S205, which functions to collect information (e.g., data) with which to determine the occurrence of a collision and to reconstruct on or more features of the collision.

The set of inputs collected in S205 is preferably at least partially received from a set of one or more mobile devices, further preferably from one or more sensors of the mobile device, such as through a software development kit (SDK) and/or a client application executing on each of the set of mobile devices. Additionally or alternatively, information can be collected from the vehicle (e.g., through one or more sensors of the vehicle, through an on-board diagnostics port, etc.), devices external to a vehicle (e.g., road infrastructure devices such as cameras associated with a set of traffic lights), one or more users (e.g., observers), and/or any other suitable information sources.

The information is preferably, at least in part, collected continuously while the vehicle is being driven and optionally while the vehicle is not being driven (e.g., while parked). Additionally or alternatively, any or all of the information can be collected periodically (e.g., at regular intervals, at irregular intervals, at a predetermined frequency, etc.). The information is further preferably collected automatically in response to a trigger (e.g., detection of a nonzero vehicle speed to indicate the initiation of a trip), but can additionally or alternatively be collected in response to multiple triggers, collected in response to a user input (e.g., notification from a user that an accident has occurred) and/or permission, and/or otherwise collected.

S205 is preferably performed continuously throughout the method 200 and further continuously while the driver is driving, but can additionally or alternatively be performed once, multiple times, and/or any combination. S205 is preferably performed prior to S210 but can additionally or alternatively be performed prior to S220, after S210, prior to S230, after S230, and/or at any other suitable times. Further additionally or alternatively, an instance of S205 can be performed prior to S210 (e.g., wherein a collision is detected based on a first set of inputs) and after S210, wherein the second set of inputs and/or any or all of the first set of inputs is used to reconstruct the collision.

The information collected in S205 is preferably received at a processing system (e.g., remote computing system, mobile device computing system, processor of mobile device, etc.) and/or database of the system (e.g., as described above) for processing and/or storage, but can additionally or alternatively be received at any suitable location(s).

In the event of a collision, at least a portion of the information is preferably collected contemporaneously with the collision, such as during the collision, just prior to the accident, and/or immediately following the collision. In variations in which information is collected following a collision, the method 200 can optionally include overriding one or more triggers (e.g., vehicle speed below a predetermined threshold, vehicle reaching an 'off' state, detection of a vehicle malfunction, etc.) for ceasing data collection. In specific examples, for instance, a trigger normally associated with the end of a vehicle's drive (e.g., vehicle has stopped moving, vehicle has zero speed for a predetermined duration, etc.) is overridden in response to detecting an accident (such as through any or all of the processes described in U.S. application Ser. No. 15/243,565, filed 22 Aug. 2016, which is incorporated in its entirety by this reference), the collection of information continues.

S205 can optionally include any or all of: marking, tagging, flagging, prioritizing, ranking, filtering (e.g., signals filtering, filtering to different locations, etc.), pre-processing, or otherwise adjusting the information collected in S210. In some variations, for instance, information collected contemporaneously with an accident is tagged for further (e.g., more detailed) processing.

The information collected in S205 preferably includes location information associated with the location and/or trajectory of the vehicle. This can include any or all of: geographical information (e.g., GPS coordinates), route information (e.g., vehicle is located at an intersection, vehicle is in an outside lane, vehicle is at a stop sign, etc.), a starting location of the vehicle's route, a destination of the vehicle (e.g., as an input into a navigation application, etc.), and/or any other suitable information. The location information is preferably collected from a GPS sensor of a mobile device of an individual inside the vehicle via an SDK operating on the mobile device, but can additionally or alternatively be otherwise received from any suitable source.

The information collected in S205 can additionally or alternatively include temporal information associated with the vehicle, such as any or all of: a time (e.g., associated with the occurrence of an accident), one or more temporal characteristics associated with (e.g., determined based on, derived from, etc.) a time (e.g., accident occurred during rush hour, accident occurred outside of rush hour, traffic level at the associated time, predicted activity of the user, etc.), and/or any other suitable information.

Further additionally or alternatively, the information collected in S205 can include vehicle information associated with one or more vehicles. The one or more vehicles preferably includes a vehicle involved in the accident, but can additionally or alternatively include a vehicle nearby the accident (e.g., associated with an observer), a vehicle unrelated to the accident (e.g., associated with the route, aggregated into a set of data, etc.), and/or any other suitable vehicles.

The vehicle information preferably includes movement information (equivalently referred to herein as motion information) associated with the vehicle, which refers to any data related to the position, velocity, and/or acceleration of any or all of the vehicles described above. In preferred variations, the motion information collected and/or determined based on information collected in S205 includes acceleration, velocity, and position information, but can additionally or alternatively include other motion information and/or a subset of this information (e.g., only acceleration).

Movement data can be collected from and/or associated with any one or more of: motion sensors (e.g., multi-axis and/or single-axis accelerometers, gyroscopes, etc.), location sensors (e.g., GPS data collection components, magnetometer, compass, altimeter, etc.), and/or any other suitable components. Such components are preferably arranged at a mobile computing device (e.g., smartphone, laptop, tablet, smart watch, smart glasses, medical devices, etc.) associated with a user (e.g., a vehicle driver), wherein the motion information of the mobile computing device is used to determine (e.g., equated to, based on orientation information of the mobile computing device, etc.) motion information corresponding to the vehicle in which the mobile computing device is located. As such, the movement data can optionally include orientation information from the mobile computing device (e.g., in east-north-up coordinates), wherein the orientation information is used to isolate and remove (e.g., subtract) movement of the mobile computing device relative to the vehicle, thereby enable movement of the vehicle relative to the earth to be determined and/or better approximated.

In some variations, for instance, S205 can include receiving one or more movement datasets collected at least at one of a location sensor and a motion sensor arranged within the vehicle, where the location sensor and the motion sensor are arranged at a mobile computing device positioned within the vehicle. Additionally or alternatively, the vehicle can include onboard sensors (e.g., speedometers, accelerometers, etc.) used in collecting movement data. For example, S205 can include collecting a movement dataset at at least one of a location sensor and a motion sensor of a vehicle (e.g., a vehicle that is being driven by the user). However, any suitable components associated with any suitable devices can be used in collecting movement data and/or data from which movement data can be derived. For example, S205 can include deriving movement data from visual data (e.g., deriving velocity from video taken by a smartphone's camera) and/or audio data (e.g., deriving motion from Doppler effects captured in data from the smartphone's microphone, etc.), as described in more detail below.

The vehicle information can additionally or alternatively include data from vehicle sensors such as OEM sensors and/or sensors mounted to and/or otherwise coupled to the vehicle, which can include any one or more of: proximity sensor data (e.g., radar, electromagnetic sensor data, ultrasonic sensor data, light detection and ranging, light amplification for detection and ranging, line laser scanner, laser detection and ranging, airborne laser swath mapping, laser altimetry, sonar, etc.), vehicle camera data (e.g., in-car cameras, exterior cameras, back-up cameras, dashboard cameras, front-view cameras, side-view cameras, image recognition data, infrared camera, 3D stereo camera, monocular camera, etc.), car speed, RPM data, odometer, altimeter, location sensor data (e.g., GPS data, compass data, etc.), motion sensor data (e.g., from an accelerometer, gyroscope, etc.), environmental data (e.g., pressure, temperature, etc.), light sensor data (e.g., from infrared sensors, ambient light sensors, etc.), fuel level (e.g., percentile-based, distance-based, low warning, etc.), fuel system status, oxygen sensor data, throttle position, gear data (e.g., drive, neutral, park, reverse, gear number, etc.), HVAC data (e.g., current temperature, target temperature, etc.), driving status (e.g., restricted features such as user inputs into control panel, unrestricted features, etc.), and/or any other suitable vehicle data. For example, vehicle sensor data can provide information on the status of a vehicle before/during/after an accident (e.g., by collecting airbag deployment data, ABS or other braking system data, engine temperature data, etc.). For example, S205 can include receiving a proximity dataset collected at a proximity sensor of the vehicle.

Vehicle sensor data (e.g., vehicle subsystem status data) can optionally partially or fully be collected via the vehicle's on-board diagnostics (OBD) port. For example, S205 can include using OBD-II Parameter IDs to request OBD data from a vehicle. In another example, S205 can include detecting deployment of an airbag through a communicable link with a vehicle. However, collecting vehicle sensor data through the OBD system can be performed in any manner and/or the S205 can be performed in absence of collecting information from an OBD port and/or vehicle sensor data can be collected in any other suitable ways.

In a first variation, the vehicle information collected in S205 and/or determined based on vehicle information collected in S205 includes any or all of: a vehicle location (e.g., in GPS coordinates), a vehicle speed (e.g., deceleration speed), a vehicle acceleration, a vehicle action (e.g., braking, accelerating, turning, maintaining a speed, etc.), a vehicle heading (e.g., forward, backward, particular heading angle, etc.), a type of vehicle (e.g., make of vehicle involved in accident), an airbag deployment parameter (e.g., as measured as a change in pressure in the vehicle cabin), a G-force/severity of an accident, a direction and/or location of impact, a stopping distance of the vehicle, and/or any other suitable information.

In specific examples, the information collected in one or more instances of S205 includes information which occurs in time after the collision (e.g., user's location after collision, etc.), which can be used, for instance, in evaluating one or more models and/or modules (e.g., as described below). In a particular specific example, for instance, the user's location after a collision is used to see where the user travels to (e.g., to see if user goes to an auto body shop, hospital, home, stays in middle of highway, etc.), which can function to determine any or all of: whether or not a collision occurred (e.g., at the collision detection algorithm, at the confidence module, etc.), whether or not the collision was severe (e.g., at the severity detection algorithm), whether or not fraud was detected (e.g., at the fraud module), and/or any suitable outputs.

The information collected in S205 can additionally include driver information, such as any or all of: historical information associated with the driver (e.g., prior history of collisions, prior history of fraud, riskiness of driver's driving behavior as represented in a driving risk score, etc.), a driver's attention and/or distraction level, an activity of the driver (e.g., texting), a driver score (e.g., safety score, risk score, etc.), a driver behavior (e.g., during accident, prior to accident, after accident, etc.), circumstantial information (e.g., driver had a long work day beforehand and was tired, driver was in an area he had never driven in before, etc.), intoxication level, and/or any other suitable information. Further additionally or alternatively, any other user information, such as passenger information, observer information, and/or any other information can be collected.

The information collected in S205 can further additionally or alternatively include environmental and/or circumstantial information (e.g., any or all of the auxiliary information described above) which characterize a driving environment of the vehicle, such as any or all of: a type of road (e.g., highway, residential, school-zone road, hospital-zone road, parking lot, one-way road, two-way road, number of lanes of road, etc.), environmental conditions at the time of driving (e.g., weather conditions, road conditions, time of day/amount of light, etc.), road conditions (e.g., paved surface, un-paved surface, smooth surface, pothole incidence, etc.), traffic conditions (e.g., traffic level), and/or any other suitable information.

The information collected in S205 can further additionally or alternatively include information directly related to a collision, such as any or all of: police reports, claims reports and/or any other information from an insurance entity, information related messages and/or calls and/or notifications at a mobile computing device of the user (e.g., indicating that user has called emergency services, indicated that user has called an auto body shop, indicating that user is responsive, etc.), and/or any other suitable information.

In a first variation of S205, all of the information collected is collected via an SDK of a set of one or more mobile devices, wherein at least one mobile device is associated with a vehicle involved in the accident.

In a second variation of S205, a first portion of the set of inputs is collected is collected via an SDK of a set of one or more mobile devices, wherein at least one mobile device is associated with a vehicle involved in the accident, and a second portion of the set of inputs is collected from any or all of: a processing system onboard and/or mounted to the vehicle, one or more stored databases (e.g., at the mobile device, at remote storage, etc.), an online source (e.g., weather source, traffic conditions source, etc.), and/or from any other suitable sources.

Additionally or alternatively, the set of inputs collected in S205 can include any other suitable inputs collected in any suitable ways from any suitable sources.

4.2 Method: Detecting a Collision and/or One or More Features of the Collision S210

The method preferably includes detecting a collision and/or one or more features of the collision S210, which functions to classify the set of inputs in S205 as corresponding to a collision (or not). Additionally or alternatively, S210 can function to determine (e.g., detect, classify, etc.) one or more features associated with a collision (e.g., severity, direction of impact, etc.), produce a set of outputs with which to perform S220, trigger an response (e.g., an emergency response), and/or can perform any other suitable functions.

S210 is preferably performed at a processing system (e.g., remote processor, processor of one or more mobile devices, etc.) and/or computing system (e.g., remote computing system), such as any of those described above in the system 100, but can additionally or alternatively be performed by any suitable component(s).

S210 is preferably performed in response to S205, but any or all of S210 (e.g., the collision detection algorithm) can additionally or alternatively be performed prior to S205 (e.g., to prompt collection of one or more inputs in S205) and/or at any other suitable times. Additionally or alternatively, S210 can be performed in parallel with and/or part of S220. Further additionally or alternatively, S210 can be performed multiple times throughout the method 200 (e.g., continuously, at a predetermined frequency, at a set of random intervals, etc.) and/or at any other suitable times.

S210 includes analyzing (e.g., assessing, processing, etc.) the information collected in S205, with a set of models 110 including a collision model (e.g., as shown in FIG. 1). The collision model preferably includes a set of one or more classifiers (e.g., as described above), further preferably a set of machine learning (e.g., traditional machine learning, deep learning, etc.) classifiers, such as any or all of the classifiers described above. Additionally or alternatively, any other suitable algorithms and/or models can be used in the collision model.

The collision model preferably receives as input at least a set of sensor inputs received in S205 (e.g., from a mobile device of the driver), such as any or all of: location information (e.g., GPS coordinates from a GPS sensor of the mobile device), acceleration information (e.g., from an accelerometer of the mobile device, from an inertial measurement unit [IMU] of the mobile device), pressure information (e.g., from a barometer of the mobile device to detect changes in pressure in the vehicle as resulting from airbag deployment, for instance), orientation information (e.g., from an IMU of the mobile device), and/or any other suitable sensor information. Additionally or alternatively, the collision model can receive sensor information from sensors independent of (e.g., offboard) the mobile device (e.g., from vehicle sensors, from environmental sensors, etc.), information other than sensor information (e.g., historical information, a risk score and/or prior driving behavior of the driver, environmental information, etc.), and/or any other suitable information.

The algorithms (e.g., classifiers) of the collision model can individually and/or collectively function to take into account and aggregate the multiple types of information sources collected above, which as previously described, are conventionally not available for reconstruction analyses. In examples, the algorithms of the collision model can function to take into account circumstantial driver information (e.g., duration of drive, driver risk score, driver's amount of phone use, driver distraction level, etc.), along with location and/or vehicle information (e.g., speed, direction, location, etc.) to detect a collision and/or determine one or more features of the collision.

The outputs of the algorithms can include and/or be used to determine any or all of: a binary output (e.g., binary classification, binary output determined based on a set of probabilities, etc.), a non-binary output (e.g., a non-binary classification, a multi-class classification, etc.), and/or any combination of outputs. Further additionally or alternatively, the algorithm outputs (or other outputs of the collision model) can include any or all of: parameter values (e.g., vehicle speed, vehicle acceleration, outputs from one or more dynamic equations, motion parameter values, etc.) such as those related to auxiliary information as described above and/or below, a set of parameters (e.g., weights) for use in implementing one or more modules in S220, and/or any other suitable outputs.

In a preferred set of variations, the algorithms in the collision model produce one or more probabilistic outputs, which can be used to make a set of one or more classifications (e.g., based on comparison with one or more probability thresholds, based on comparison with each other wherein the class/label associated with the higher probability is selected, as shown in FIG. 3, etc.), trigger S220 (e.g., in response to determining a collision has occurred), and/or be used as inputs in S220 (e.g., wherein any or all of the modules determine outputs based in part or in full on the probabilistic outputs). Additionally or alternatively, the outputs can be used, for instance, in triggering a response and/or for use in producing an output in S230 (e.g., a report, an insurance claim, etc.). The collision model further preferably calculates and/or passes along auxiliary information which is used by the set of modules to determine any or all of the module outputs. Additionally or alternatively, auxiliary information can be produced by other model(s), S210 can be absent of producing and/or interfacing with auxiliary information, and/or the model in S210 can be otherwise evaluated.

The set of algorithms preferably includes a collision detection algorithm (e.g., as described above), wherein the collision detection algorithm functions to detect that a collision has occurred. Additionally or alternatively, the collision detection algorithm can function to prompt the performance of other algorithms, trigger an emergency response, and/or can perform any other suitable functions. The collision detection algorithm preferably produces a binary determination (and/or enables a binary determination) of whether or not a collision has occurred ("yes" collision vs. "no" collision), such as through the determination of one or more probability values related to the occurrence of a collision (e.g., probability that a collision has occurred). In specific examples, for instance, these probability values can be used to make the binary determination (e.g., by comparing with a threshold, by selecting the higher of a probability of a collision having occurred and the probability of a collision having not had occurred, etc.). Additionally or alternatively, the collision detection algorithm can produce any other suitable outputs.

In preferred variations, the collision detection algorithm implements one or more machine learning algorithms, wherein the machine learning algorithms have been trained (e.g., as described below) to detect a collision. The machine learning algorithms preferably include both traditional machine learning and deep learning (e.g., as described above), but can additionally or alternatively include classical approaches, only traditional machine learning approaches, only deep learning approaches, and/or any other suitable approaches and/or combination of approaches. In specific examples, the collision detection algorithm is trained to detect a collision based at least on motion information associated with the vehicle (e.g., as collected at a mobile device of the driver inside of the vehicle), such as motion information corresponding to any or all of: a sudden acceleration of the vehicle, a sudden deceleration of the vehicle, a sudden change in direction of the vehicle's movement, a change in the vehicle's orientation, and/or any other suitable indicators of a collision. Additionally or alternatively, the collision detection algorithm can implement any or all of the processes, embodiments, and/or examples described in U.S. application Ser. No. 15/243,565, filed 22 Aug. 2016, which is incorporated herein in its entirety by this reference.

In a first specific example, the collision detection algorithm implements a gradient boosting machine algorithm (e.g., traditional machine learning gradient boosting machine), optionally in combination with a deep learning algorithm, configured to determine a classification of whether or not a collision has occurred.

The set of algorithms further preferably includes one or more collision feature detection algorithms, wherein the collision feature detection algorithms are configured to classify one or more features associated with the collision, such as, but not limited to, a severity of the collision (e.g., whether or not the collision is determined to be severe), a direction of impact to the vehicle, and/or any other suitable features. Additionally or alternatively, the collision feature detection algorithms can be configured to calculate one or more parameters associated with the collision, assign a ranking to a collision relative to other collisions, trigger an action and/or response, and/or can perform any other suitable functions.

The collision feature detection algorithms are preferably performed in response to (e.g., after) the collision detection algorithm, but can additionally or alternatively be performed contemporaneously with (e.g., in parallel with, partially overlapping with, fully overlapping with, etc.) the collision detection algorithm, prior to the collision detection algorithm (e.g., prior to a repeated instance of the collision detection algorithm), and/or at any other suitable times.

The set of collision feature detection algorithms can optionally include a severity detection algorithm, wherein the severity detection algorithm is preferably configured to determine a binary classification of whether or not the collision is severe, wherein a severe collision can refer to a collision, for instance, involving any or all of: an injury (e.g., of the driver, of a passenger, of a pedestrian, etc.), a fatality (e.g., of the driver, of a passenger, of a pedestrian, etc.), vehicular damage (e.g., totaled vehicle, minor damage, no damage, etc.), infrastructure damage (e.g., hit traffic sign), other factors, a combination of factors, and/or any other suitable classification of collision severity. Additionally or alternatively, the severity detection algorithm can detect a type of severity (e.g., fatality of driver vs. non-fatality of driver, fatality of passenger vs. non-fatality of passenger, totaled vehicle vs. non-totaled vehicle, etc.), a severity indication as indicated by a spectrum of severities, one or more parameter values, and/or any other suitable outputs.

The severity detection algorithm is preferably in the form of a machine learning algorithm, further preferably a gradient boosting machine algorithm and optionally a deep learning algorithm (e.g., as described above for the collision detection algorithm, different than that described above for the collision detection algorithm, etc.), but can additionally or alternatively include any other algorithms.

Additionally or alternatively, the set of collision feature detection algorithms can optionally include a direction of impact detection algorithm, wherein the direction of impact detection algorithm is preferably configured to classify the impact experienced by the vehicle in the collision. The direction of impact choices preferably include the following options (e.g., labels, classes, etc.), but can additionally or alternatively include any other suitable options: frontal impact, rear impact, broad side impact, side swipe impact, and rollover impact. Additionally or alternatively, the direction of impact detection algorithm can identify a location of impact on the vehicle (e.g., passenger door, passenger's side rear door, driver door, driver's side rear door, rear of vehicle, rear bumper, front of vehicle, front bumper, etc.), a direction of impact on another vehicle in the collision, and/or any other suitable parameters.

The output(s) of the direction of impact algorithm can include any or all of: a set of probabilities (e.g., associated with each option for direction of impact), a determined direction of impact (e.g., determined based on the set of probabilities, determined independently of the set of probabilities, associated with a particular confidence value, etc.), and/or any other suitable parameters and/or combination.

The direction of impact detection algorithm is preferably a classifier (e.g., multi-class classifier) in the form of a machine learning algorithm, further preferably a gradient boosting machine algorithm and optionally a deep learning algorithm (e.g., as described above for the collision detection algorithm, different than that described above for the collision detection algorithm, etc.), but can additionally or alternatively include any other algorithms.

In variations of S210 including multiple algorithms, the algorithms can be implemented in any or all of: series, parallel, and/or any combination. Additionally or alternatively, the algorithms can be any or all of: initiated automatically (e.g., in response to S205), initiated in response to a trigger (e.g., in response to detecting a collision, in response to the performance of and/or the outputs of another algorithm, in response to a temporal condition, etc.), initiated as prompted by a decision tree and/or lookup table, otherwise initiated, and/or initiated based on any combination of triggers and/or prompts.

Additionally or alternatively, the order in which any or all of the algorithms is performed can be determined based on a priority (e.g., predetermined priority, dynamically determined priority, etc.) associated with one or algorithms. In some examples, for instance, one or more algorithms which have the most time-sensitive outputs (e.g., a collision detection algorithm which prompts other algorithms and/or other processes such as emergency responses) are implemented first. In a particular example, the collision detection algorithm is implemented first, wherein the determination made by the collision detection algorithm can be used for any or all of: prompting the performance of other algorithms (e.g., collision feature algorithms) in S210; prompting the performance of one or more modules in S220; prompting one or more actions (e.g., notifying the driver at the driver's mobile device, notifying a passenger at the passenger's mobile device, etc.) and/or responses (e.g., initiating an emergency response, calling an ambulance, etc.) in S230; and/or prompting any other processes. In specific examples, for instance, in an event that a collision is detected in a collision detection algorithm of S210, the collision detection feature algorithms can be prompted in return, and in an event that a collision is determined not to be detected in an collision detection algorithm of S210, the method can be terminated and/or otherwise proceed (e.g., to S220, to S230, etc.). Additionally or alternatively, any or all of these processes can be performed independently of the outcomes of other algorithms, otherwise dependent on the outcomes of other algorithms, and/or can be otherwise performed.

Figure 4A:
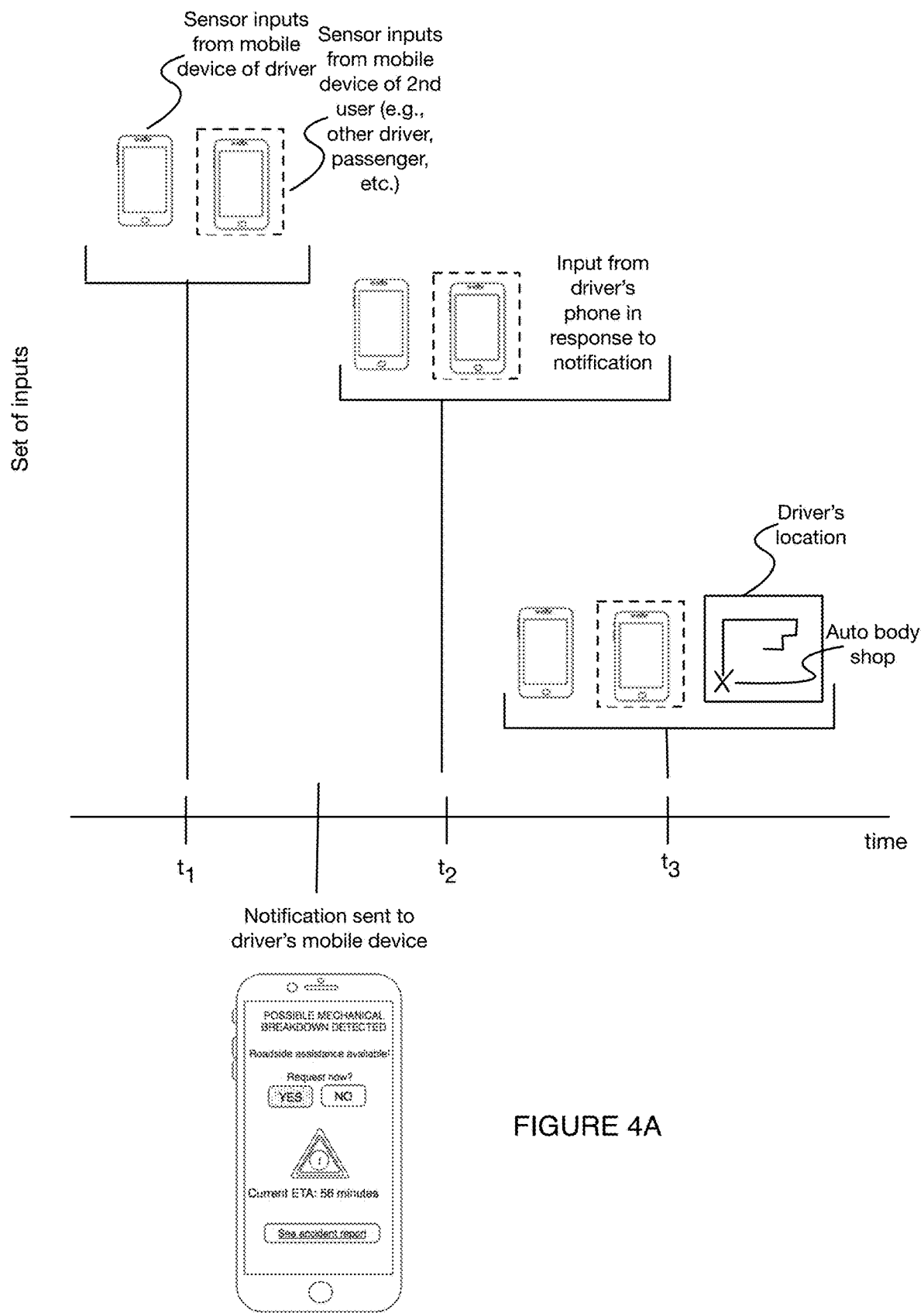
FIGS. 4A-4B depict an example for illustrative purposes of a set of inputs collected over multiple time points and their use in a set of models and modules.
Figure 4B:
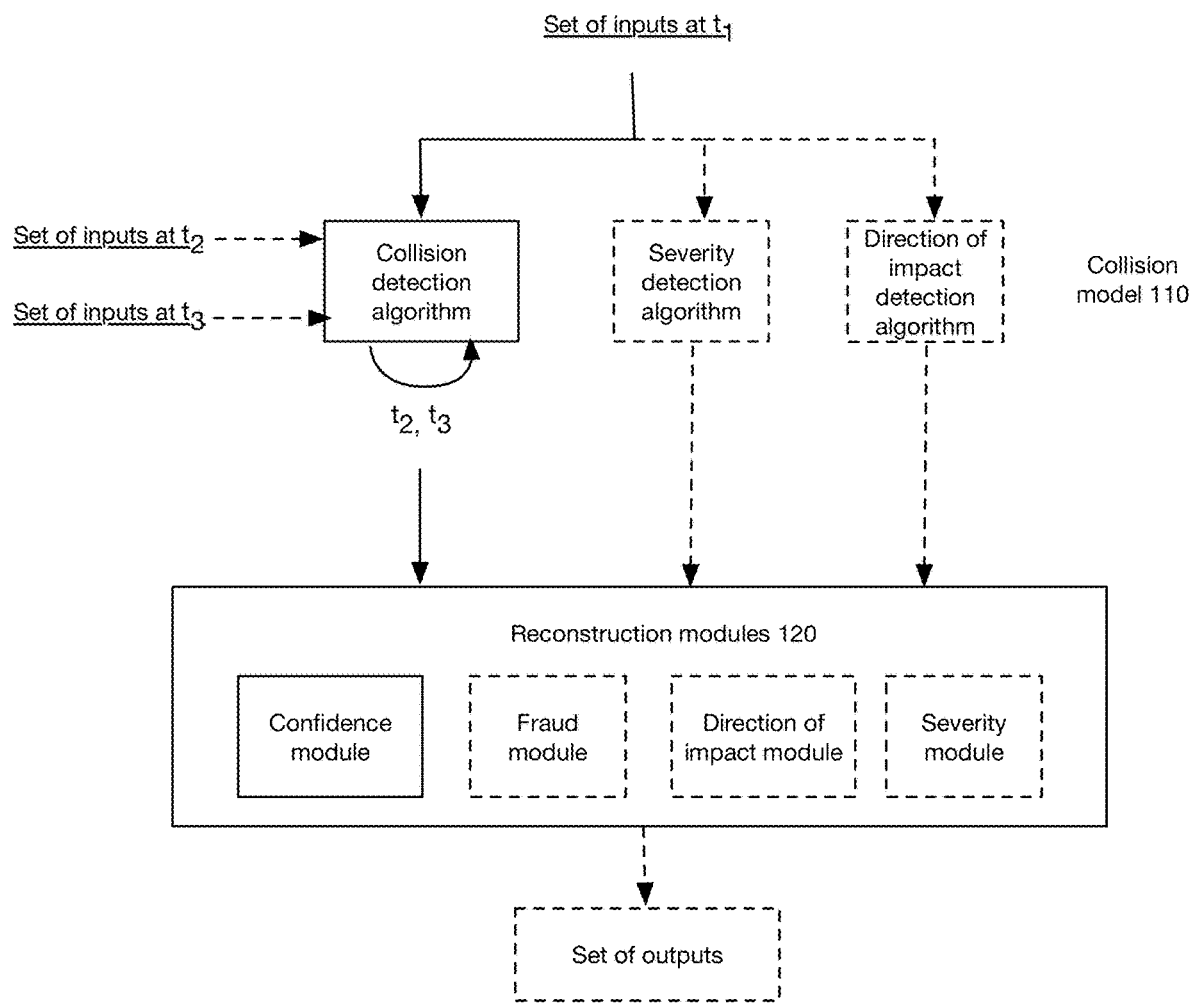

Further additionally or alternatively, any or all of the algorithms can be performed: a single time, multiple times (e.g., as shown in FIGS. 4A-4B), and/or any combination. In collision detection, for instance, this can function to handle a tradeoff between the time required to detect a collision and the accuracy associated with the detection. Implementing this can function, for instance, to both quickly check for a collision in order to provide a quick response if needed and to utilize additional information which continues to be received (e.g., in response to repeated instances of S205) to confirm or deny this decision. In some cases, for instance, a driver's behavior after a collision can be used to come to a more accurate conclusion as to whether a collision occurred (e.g., if driver's vehicle stops in the middle of an intersection, if driver's vehicle is left on the highway, if driver calls a tow truck, if driver visits an auto body shop, if driver visits a hospital, etc.) or did not (e.g., if driver quickly continues driving along original route). In a preferred set of variations, the collision detection algorithm in S210 is performed multiple times (e.g., as shown in FIGS. 4A-4B), such as any or all of: a predetermined number of times (e.g., 2 times, 3 times, between 2 and 5 times, 5 times, between 5 and 10 times, 10 times, greater than 10 times, etc.); continuously (e.g., at a predetermined frequency); until a threshold condition and/or trigger condition is met (e.g., until confirmation that a collision has not occurred is determined, in response to a driver responding to a notification to confirm that he has not been in a collision, etc.); and/or any number of times. In specific examples, the collision detection algorithm is performed 3 times, first at 20 seconds after a potential collision is detected, again at 60 seconds after the potential collision is detected, and yet again at 120 seconds after the potential collision is detected. In alternative examples, this timing and number of times can be suitably adjusted.

Additionally or alternatively, the collision detection algorithm can be performed once, other algorithms can be performed multiple times, and/or the algorithms can be otherwise performed.

S210 can optionally include aggregating (e.g., combining, summing, averaging, combining according to an algorithm and/or equation and/or lookup table, etc.) any or all of the algorithm outputs. Additionally or alternatively, any or all of the algorithm outputs can remain independent.

In a first variation of S220, a set of machine learning classifiers are implemented which receive information collected in S205 and process the information to determine a set of probabilistic outputs related to any or all of: an occurrence of a collision, a severity of the collision, a direction of impact of the vehicle in the collision, and/or any other suitable outputs.

S210 can additionally or alternatively include any other processes. In some variations, for instance, S210 (and/or any other processes in the method) include determining one or more driving events, such as, but not limited to, any or all of: a hard brake event (e.g., in which the driver brakes a significant amount in a short distance and/or time, in which the driver brakes suddenly, etc.); a sudden acceleration event (e.g., in which the vehicle changes direction and/or speed suddenly and/or over a short distance or time); a mobile device usage event (e.g., indicating that the driver was using his or her mobile device while driving, a distraction event, etc.); a speeding event (e.g., indicating that the driver was speeding, indicating that the driver was speeding by at least a predetermined threshold, etc.); a turning event (e.g., indicating that the vehicle turned suddenly); and/or any other suitable driving events. Identification of any or all of these events can be used in reconstructions (e.g., as shown in FIGS. 9A-9G) of a collision, provided as an output to an insurance entity, and/or otherwise used in S230 or elsewhere in the method. In specific examples, for instance, determining events can be performed as described in U.S. application Ser. No. 17/111,299, filed 3 Dec. 2020, which is incorporated herein in its entirety by this reference.

In a first set of specific examples, the collision detection algorithm is performed first, wherein the output of the collision detection algorithm triggers the performance of the collision feature detection algorithms.

In a second set of specific examples, the collision detection algorithm and the collision feature detection algorithms are performed in parallel.

In a third set of specific examples, additional or alternative to the first and second, the collision detection algorithm is performed multiple times, wherein information is continuously collected in S205 and the extra information used in the subsequent calculations.

Additionally or alternatively, S210 can include any other suitable processes and/or be otherwise performed.

4.3 Method: Reconstructing the Collision S220

The method 200 includes reconstructing the collision S220, which functions to determine features of the collision and/or information relevant to various entities (e.g., insurance entities, the driver, etc.) in light of the collision. As such, S220 can optionally function to determine who and or what is at fault for an accident, facilitate the production of an output (e.g., materials, emergency response, communication, etc.) associated with the accident in S230, and/or can perform any other suitable function(s).

S220 is preferably performed in response to S210 and based on the outputs produced in S210. Additionally or alternatively, S220 can be performed as part of S210, in parallel with S210, in response to S205, and/or at any other suitable time(s).

S220 is preferably performed with a processing system of the system 100 (e.g., the same processing system used in S210, a different processing system as that used in S210, etc.), but can additionally or alternatively be performed at any other suitable time(s). Additionally or alternatively, S220 can be performed multiple times during the method 200 (e.g., continuously, at a predetermined frequency, at random intervals, etc.) and/or at any other suitable times.

S220 is preferably performed with a set of modules (e.g., as described above), further preferably with a set of modules implementing one or more machine learning (e.g., traditional machine learning, deep learning, etc.) approaches (equivalently referred to herein as machine learning modules), such as one or more machine learning models and/or algorithms. Additionally or alternatively, any or all of the machine learning modules can implement one or more classical rule-based approaches (e.g., rule-based algorithms, decision trees, lookup tables, equations, etc.) and/or any combination of approaches.

In variations including multiple modules, each of the modules can be analyzed independently, in combination with one or more other modules, in combination with all modules, and/or otherwise evaluated. Further additionally or alternatively, the modules can be evaluated in any or all of: a serial fashion, a parallel fashion, and/or any combination. In specific examples, any or all of the modules are configured to be performed (e.g., assigned) in an ordered or partially ordered fashion, wherein at least some of the modules are prioritized as being performed first. In these examples, the modules prioritized to be performed first and preferably those which elicit emergency and/or otherwise time-sensitive responses in S230, but can additionally or alternatively be any other modules.

Additionally or alternatively, any or all of the modules can be selectively performed, such as if requested by certain entities (e.g., by an insurance entity, by the driver, etc.), based on the outputs in S210, based on the inputs received in S205, and/or otherwise selectively performed. Any or all of the modules can be performed a single time, multiple times, and/or any combination.

In variations including multiple modules, the modules can receive any or all of: the same inputs, different inputs, partially overlapping inputs, and/or any combination.

The set of modules preferably at least collectively receives as input any or all of the set of outputs produced in S210. Additionally or alternatively, each of the set of modules can receive different outputs from S210 (e.g., confidence detection module receives outputs only from collision detection algorithm while severity detection modules receives outputs only from severity detection algorithm), each of the set of modules can receive all outputs from S210, any or all of the modules can receive additional inputs (e.g., from S205, from the driver, etc.), and/or the modules can work with any other suitable information.

The set of modules preferably includes a confidence module (equivalently referred to herein as a confidence detection module), which functions to determine a confidence associated with the determination of a collision in S210 (e.g., by the collision detection module). Additionally or alternatively, the confidence detection module can function to determine a confidence associated with any other and/or all algorithms, and/or any other parameters. Further additionally or alternatively, the set of modules can include multiple confidence detection modules, be absent of a confidence detection module, and/or include any other modules.

The confidence module is preferably performed first relative to any or all of the other modules, which can function to prompt time-sensitive/time-critical responses in S230 (e.g., automatically calling emergency services, notifying the driver or other user, automatically contacting roadside assistance, etc.) as early as possible. Additionally or alternatively, the confidence detection module can be performed in parallel with other modules, after other modules, the emergency responses can be triggered based on outputs in S210, and/or the method can be otherwise suitably performed.

The confidence module is further preferably a machine learning model (e.g., traditional machine learning, deep learning, etc.), further preferably a regression model, but can additionally or alternatively include any other learned models, classical rule-based models (e.g., mappings), and/or any combination.

The confidence module preferably receives as input at least the output of a collision detection algorithm in S210, but can additionally or alternatively receive the outputs from any or all of the algorithms in S210 (e.g., severity detection algorithm, direction of impact detection algorithm, etc.), auxiliary information from S210 and/or S205, other inputs (e.g., from S205), and/or any other suitable information. The confidence detection module preferably produces as an output a confidence parameter (e.g., confidence value, confirmed "yes" or "no" determination, etc.) associated with the determination that a collision has occurred, but can additionally or alternatively produce any other outputs.

In variations in which the collision detection algorithm is performed multiple times, the confidence detection module can optionally be performed multiple times, such as each time the collision detection algorithm is performed. Additionally or alternatively, the confidence detection module can be performed once (e.g., after the last iteration of the collision detection algorithm) and/or otherwise performed.

Additionally or alternatively, the confidence module can be performed multiple times (e.g., as described for the collision detection algorithm above) independent of how many times the collision detection algorithm is performed, a single time, a dynamically determined number of times (e.g., continuously until a threshold confidence level is reached, continuously until the confidence falls below a threshold and the method is terminated, etc.), and/or any other number of times.

The set of modules further preferably includes a severity module (equivalently referred to herein as a severity detection module), which functions to determine a severity associated with the collision. This can in turn function to help an insurance entity assess the collision (e.g., perform a claim adjustment), help the driver get properly reimbursed, inform the driver and/or other entities of next steps, recommend an appropriate body shop to the driver depending on the extent of the damage, call an ambulance (e.g., automatically by the processing system, from the user's mobile device, etc.), call a tow truck (e.g., automatically by the processing system, from the user's mobile device, etc.), and/or can function to perform any other suitable functions.

The severity module is preferably performed after (e.g., and offline, and online, etc.) the confidence detection module, and optionally in response to a request from one or more entities, but can additionally or alternatively be performed at any suitable time(s).

The severity module is preferably a machine learning model (e.g., traditional machine learning, deep learning, etc.), further preferably a regression model, but can additionally or alternatively include any other learned models, classical rule-based models (e.g., mappings), and/or any combination. The severity detection module preferably receives as input at least an output of a severity detection algorithm in S210, but can additionally or alternatively receive the outputs from any or all of the algorithms in S210 (e.g., collision detection algorithm, direction of impact detection algorithm, etc.), auxiliary information from S210 and/or S205 (e.g., driver's location information, additional location information showing that the driver went to an auto body shop, additional location information showing that driver went to a hospital, etc.) other inputs (e.g., from S205), and/or any other suitable information.

The severity module can produce any number of outputs, such as, but not limited to, any or all of: one or more scores (e.g., severity score, particular type of severity score, etc.), an indication of whether or not physical damage to the vehicle has occurred and/or is suspected to have occurred (e.g., fender bender damage, more serious damage, totaled vs. not totaled, estimated cost of repairs, property damage only [PDO] conclusion, etc.); an indication of whether or not injury to a driver and/or passenger and/or pedestrian has occurred and/or is suspected to have occurred (e.g., fatal injury, minor injury, no injury, etc.), and/or any other suitable outputs. The outputs for this module (and/or any other module) can be any or all of: quantifiable (e.g., severity values), qualitative (e.g., binary, ranking, etc.), any other output, and/or any combination.

Additionally or alternatively, the set of modules can be absent of a severity module and/or can include any other modules.

The set of modules further preferably includes a direction of impact detection module, which functions to determine the direction of impact of the vehicle associated with the driver (and/or another vehicle in the collision). This can, in turn, function to determine if the driver is at fault in the collision (e.g., if the driver has frontal damage indicating that he or she rear ended a vehicle).

The directions of impact preferably include those described above, but can additionally or alternatively include any other directions of impact.

The direction of impact module is preferably performed after (e.g., and offline, and online, etc.) the confidence detection module, and optionally in response to a request from one or more entities, but can additionally or alternatively be performed at any suitable time(s).

The direction of impact module is preferably a machine learning model (e.g., traditional machine learning, deep learning, etc.), further preferably a regression model, but can additionally or alternatively include any other learned models, classical rule-based models (e.g., mappings), and/or any combination. The direction of impact module preferably receives as input at least an output of a direction of impact detection algorithm in S210, but can additionally or alternatively receive the outputs from any or all of the algorithms in S210 (e.g., collision detection algorithm, severity detection algorithm, etc.), auxiliary information from S210 and/or S205 (e.g., driver's location information, additional location information showing that the driver went to an auto body shop, additional location information showing that driver went to a hospital, etc.) other inputs (e.g., from S205), and/or any other suitable information.

The direction of impact detection module can produce any number of outputs, such as the particular direction or directions of impact (and/or equivalently the locations of impact) on the vehicle. Additionally or alternatively, the directions/locations of impact on another vehicle can be determined, and/or any other suitable outputs can be produced. The outputs for this module (and/or any other module) can be any or all of: quantifiable (e.g., severity values), qualitative (e.g., particular direction/location, binary, ranking, etc.), any other output, and/or any combination.

Additionally or alternatively, the set of modules can be absent of a direction of impact module and/or can include any other suitable modules.

The set of modules preferably includes a fraud module, wherein the fraud module is configured to detect and/or determine (e.g., determine a perpetrator of, determine a type of, etc.) fraud associated with the collision. The fraud can be associated with fraud in which the driver is the victim, fraud in which the driver is the perpetrator, and/or any combination. The fraud can include, for instance, any or all of: a staged auto accident (e.g., driver forced another driver into a collision, driver braked suddenly to have driver behind rear end him, driver suddenly accelerated to hit another vehicle that he had motioned in, swoop and squat staged accident, drive down staged accident, panic stop staged accident, sideswipe staged accident, etc.); a misrepresentation of damages (e.g., extra damages claimed after collision); an uninsured driver being covered for by an insured passenger (e.g., as detected based on the driver's driving history and/or driving behavior and/or driving style); and/or any other fraudulent activities.

The fraud module preferably detects fraud based on a classical, rule-based model, but can additionally or alternatively implement one or more machine learning models (e.g., traditional machine learning, deep learning, etc.), and/or any other processes.

The fraud module is preferably performed after (e.g., and offline, and online, etc.) the confidence detection module, and optionally in response to a request from one or more entities (e.g., insurance company, police, etc.), but can additionally or alternatively be performed at any suitable time(s).

The fraud module preferably receives as any or all of the outputs produced S210 and further preferably additional auxiliary information (e.g., driver's locations after collision, driver's mobile device usage before and/or during and/or after collision, driver's auto body shop bills after collision, etc.), but can additionally or alternatively receive a subset of this information as inputs, other inputs (e.g., from S205), and/or any other suitable information.

In some variations, the fraud module can include collecting information (e.g., in S205, after the collision, etc.) associated with another driver involved in the collision (and/or any other users such as passengers and/or pedestrians), which can function to bolster the outputs of the fraud module (e.g., by looking into another driver's behavior involved in crash).

The fraud module can produce any number of outputs, such as, but not limited to, any or all of: one or more probabilities (e.g., that the driver was involved in fraud, that another driver was involved in fraud, etc.), an identification of an individual and/or individuals involved in fraud, a confidence value (e.g., associated with a fraud determination), a type of fraud suspected, and/or any other suitable outputs.

Additionally or alternatively, the set of modules can be absent of a fraud detection module and/or can include any other suitable modules.

S220 can additionally or alternatively include any other suitable modules configured to determine any suitable outputs and performed in any suitable ways.

In a first variation, S220 includes evaluating a set of modules based on the outputs of the set of algorithms in S210 (and optionally any other information), wherein the set of modules includes any or all of a confidence module, a fraud module, a direction of impact module, a severity module, and/or any other suitable modules.

In a first example, the confidence module, direction of impact module, and the severity module are each machine learning regression models, wherein the fraud module is a classic rule-based model.

In a specific example, additional or alternative to the first, the set of modules are organized into a set of temporal groups, wherein the $1^{st}$ group includes the confidence module and is performed first (e.g., to reduce the time needed to elicit an emergency response) and the $2^{nd}$ group includes remaining modules and is performed at one or more later times (and optionally offline and/or in response to the request from an entity and/or once additional information such as the user's future location is collected).

In a third example, additional or alternative to the above examples, each of the modules receives the same set of outputs from S210 as inputs. In an alternative examples, any or all of the modules can receive different inputs relative to each other.

Additionally or alternatively, S220 can include any other processes and/or be otherwise performed.

4.4 Method: Producing an Output Based on the Reconstruction S230

The method 200 preferably includes producing an output based on the reconstruction S230, which functions to present a set of one or more features of an accident to a user or group (e.g., insurance agent, legal entity, law enforcement personnel, etc.), thereby providing key insights regarding the accident to create actionable insight. Additionally or alternatively, S230 can function to train one or more models and/or modules, predict and/or prevent the occurrence of an accident (e.g., through a notification to a driver in an accident-prone environment), and/or perform any other suitable function(s).

The output is preferably produced in response to S220, further preferably in response to processing the modules in S220, but can additionally or alternatively be produced in response to S210 (e.g., based on one or more classifiers), in response to a user request, upon confirmation of an accident, upon request by an entity, throughout the method 200, and/or at any other suitable time(s) and in response to any suitable triggers during the method 200. In some variations, for instance, data presented in the reconstruction output includes the outputs of one or more modules, auxiliary information (e.g., the vehicle speed just prior to the collision and a set of gravitational force equivalent [g-force and/or G-force] values involved in the collision) produced in S210 and/or prior to S210, optionally outputs from one or more classifiers in S210, and/or any other information produced at any suitable times during the method 200. In additional or alternative variations in which S230 involves the creation of an insurance claim, the insurance claim can be triggered and/or created and/or verified throughout the method 200.

The reconstruction output can include any or all of: a report/document (e.g., typed report, display, presentation, slide deck, video, audio recording, insurance claim, auto body report, etc.); a visualization (e.g., animated visualization of collision) such as a collision reconstruction dashboard (e.g., as shown in FIGS. 9A-9G); a score (e.g., updated driver score, updated route score such as a route risk score, etc.); a notification (e.g., text message, email, etc.); a communication (e.g., an automated call to an emergency responder, an automated call to the driver, etc.); and/or any other suitable output(s).

Figure 8A:
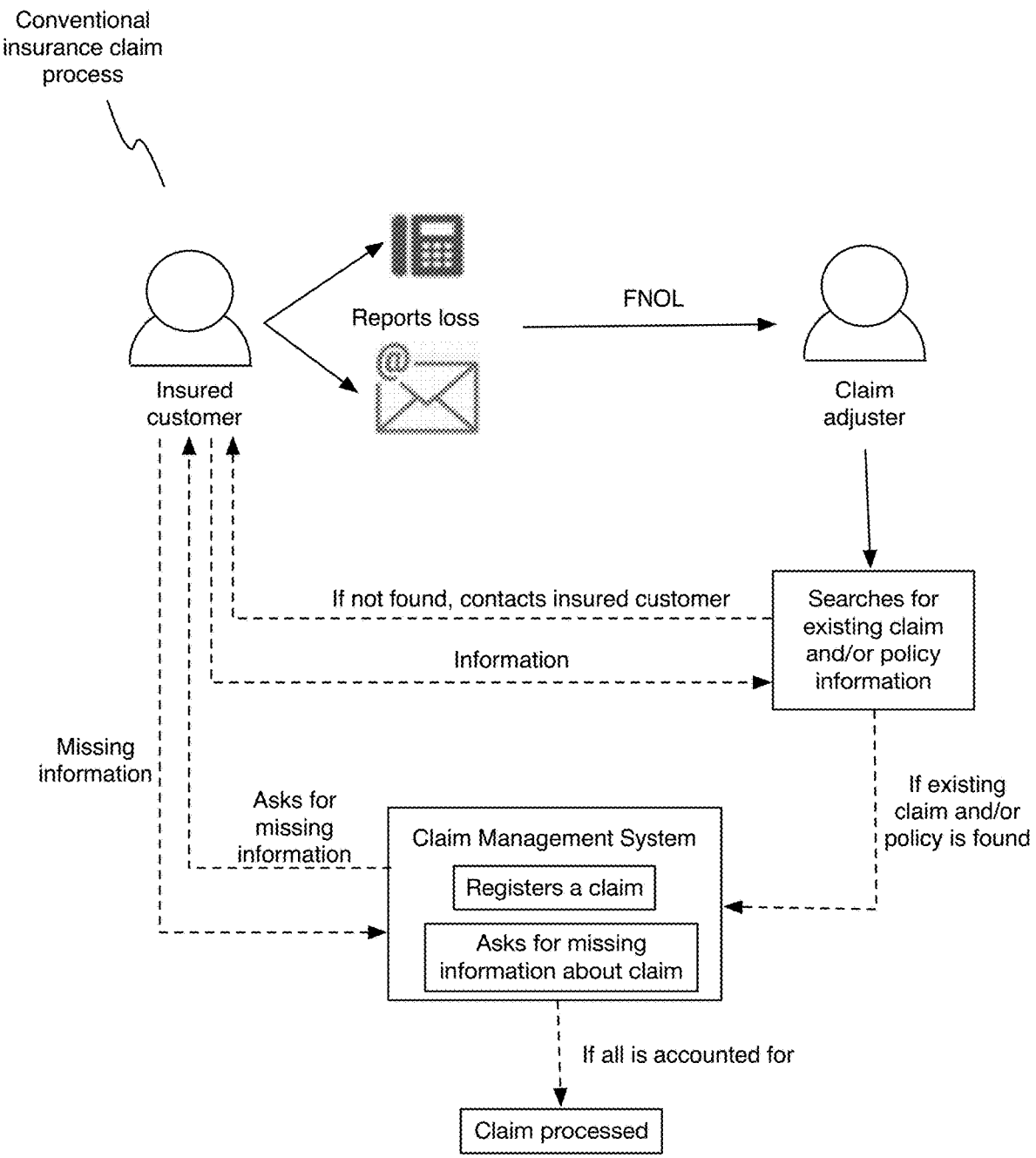
FIGS. 8A-8B depict variations of a conventional claim insurance process and a variation of a claim insurance process performed with the method 200, respectively.
Figure 8B:
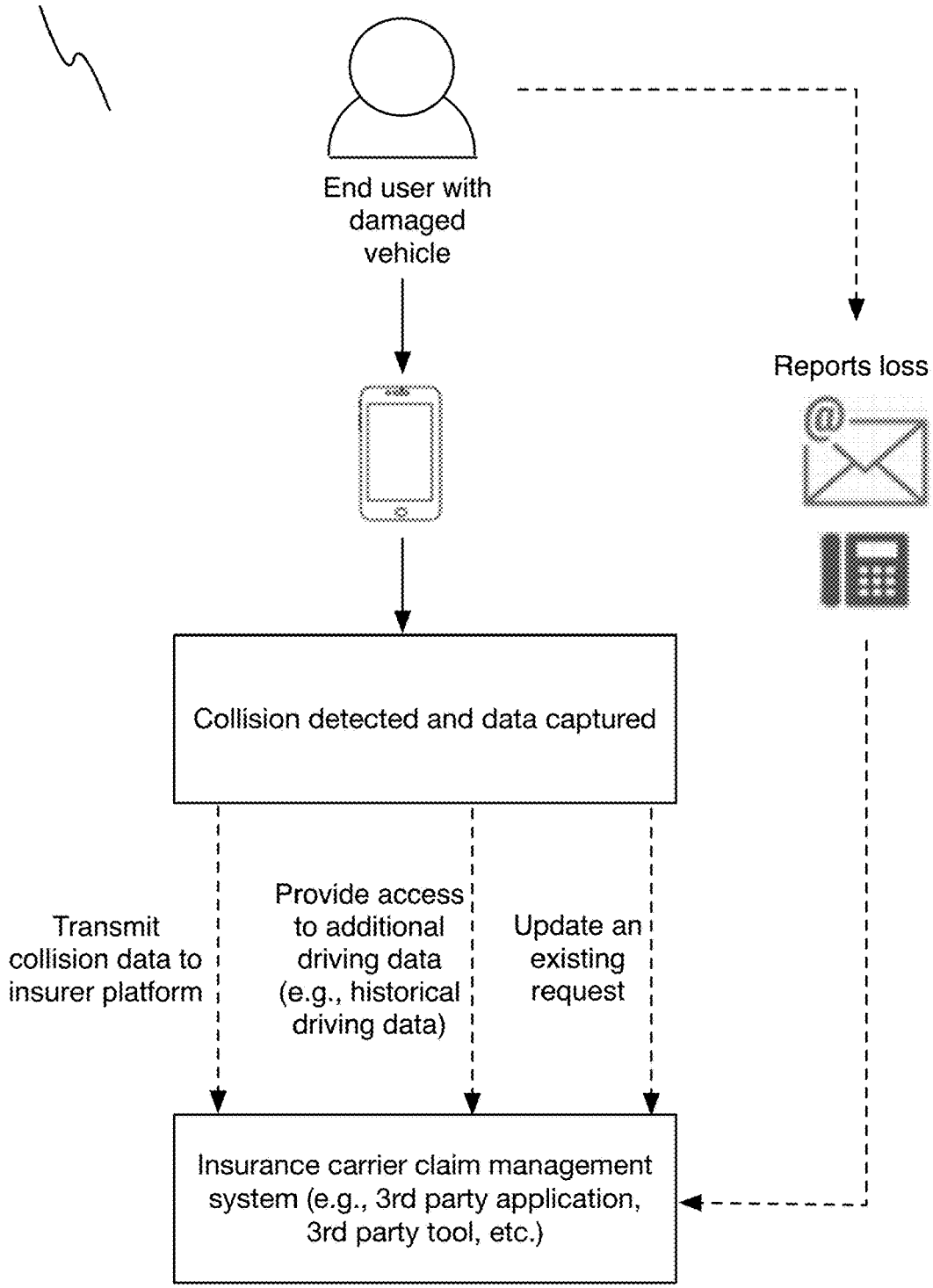
Figure 9A:
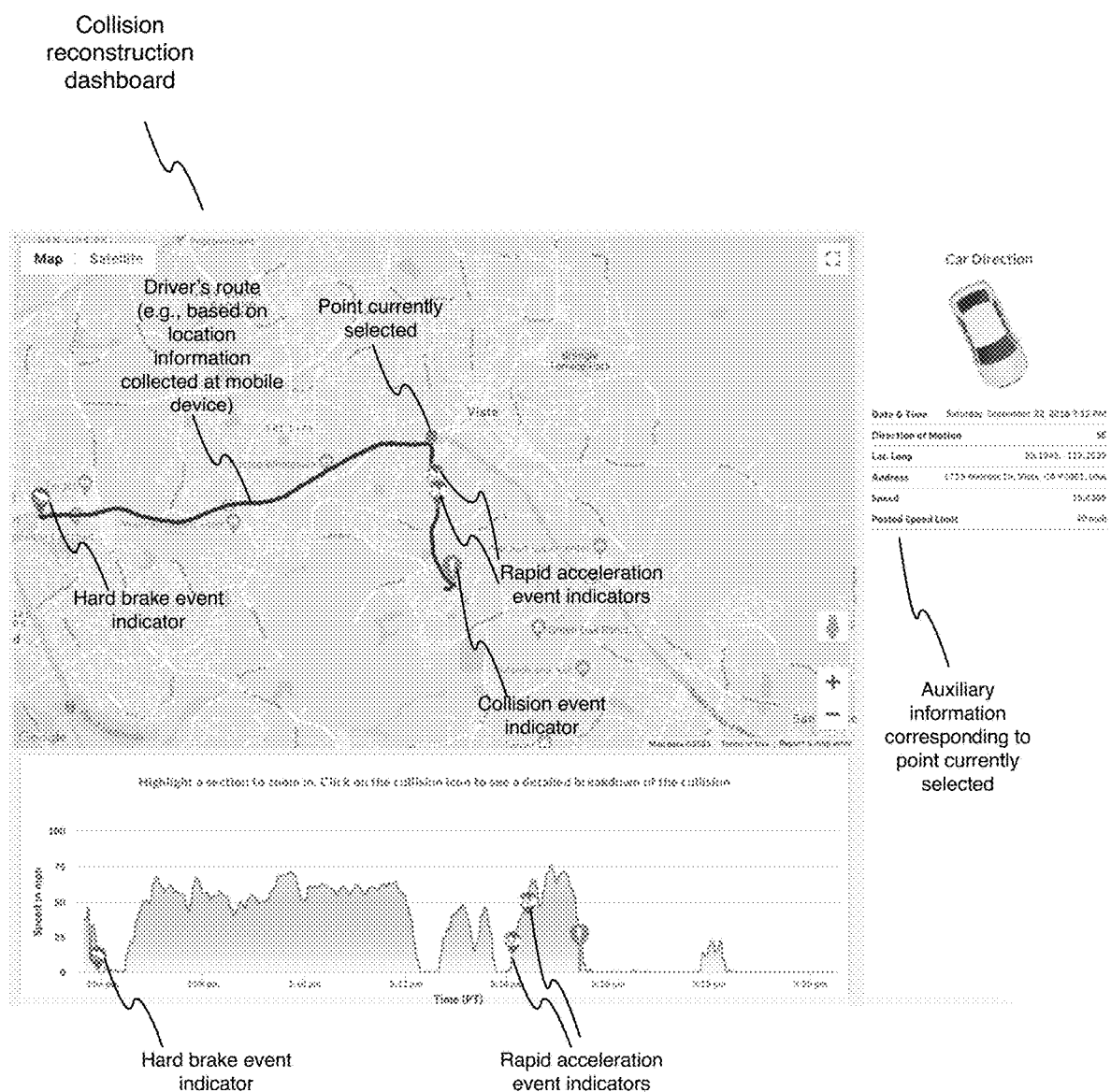
Figure 9B:
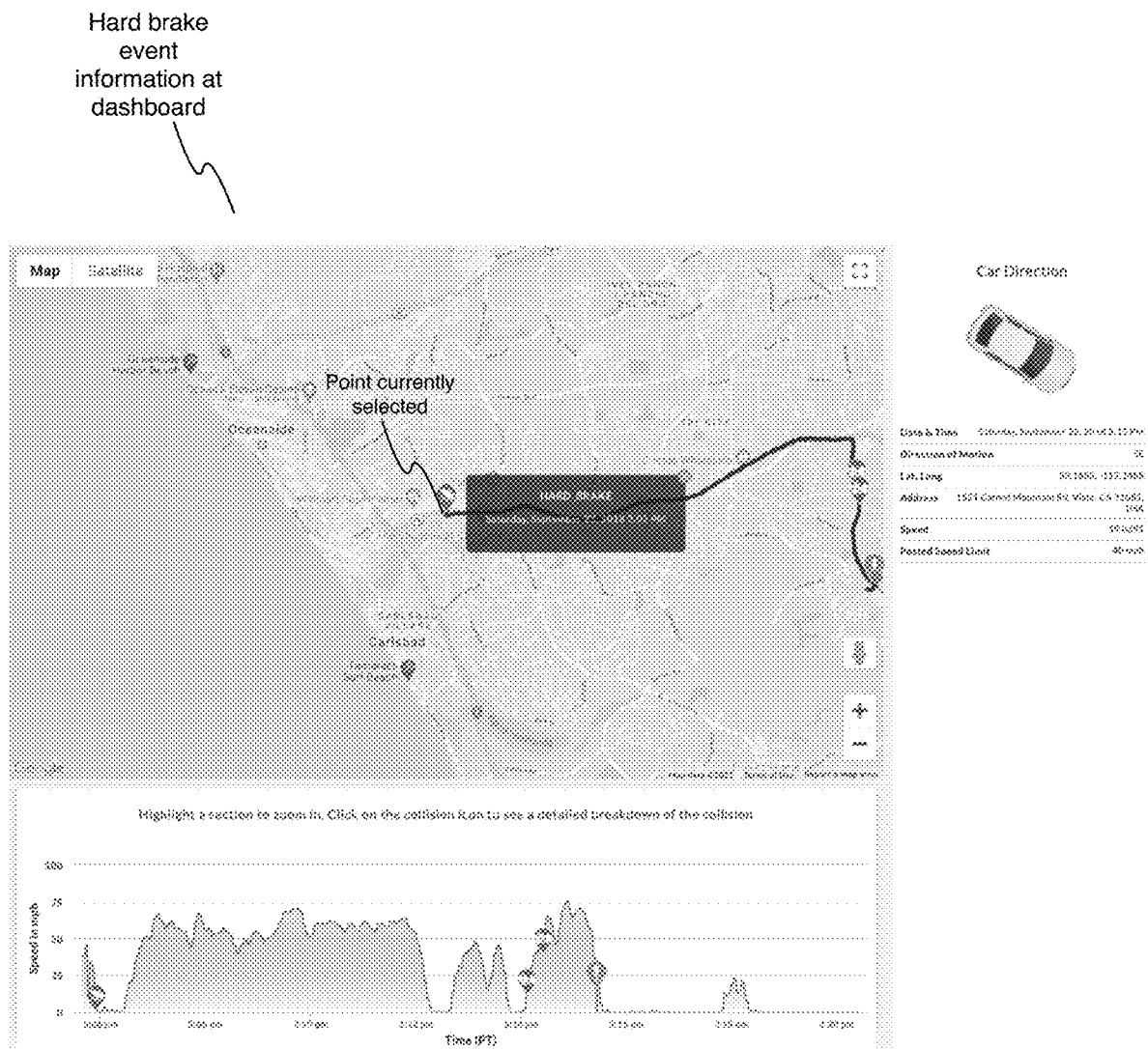
Figure 9C:
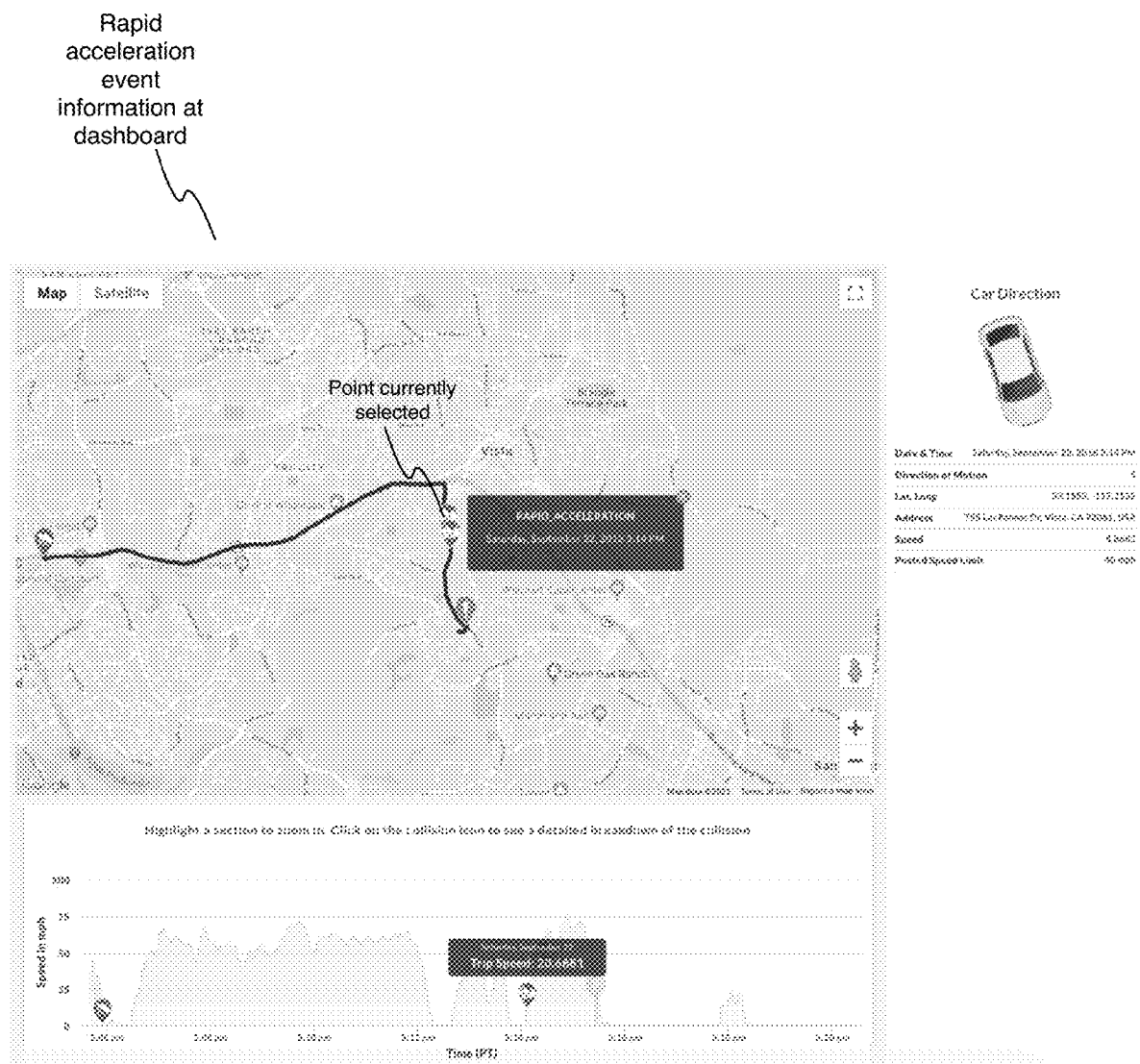
Figure 9D:
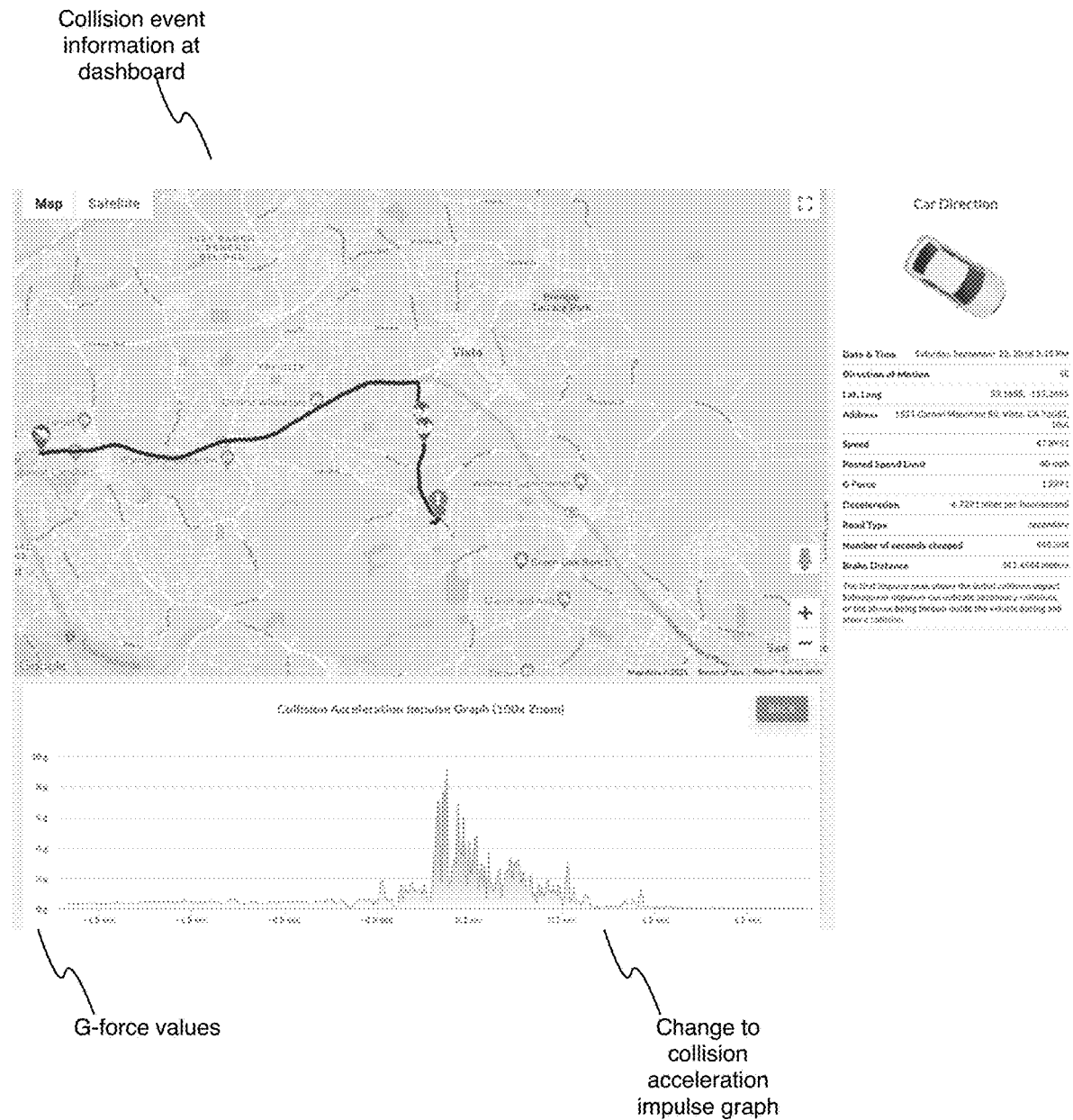
Figure 9E:
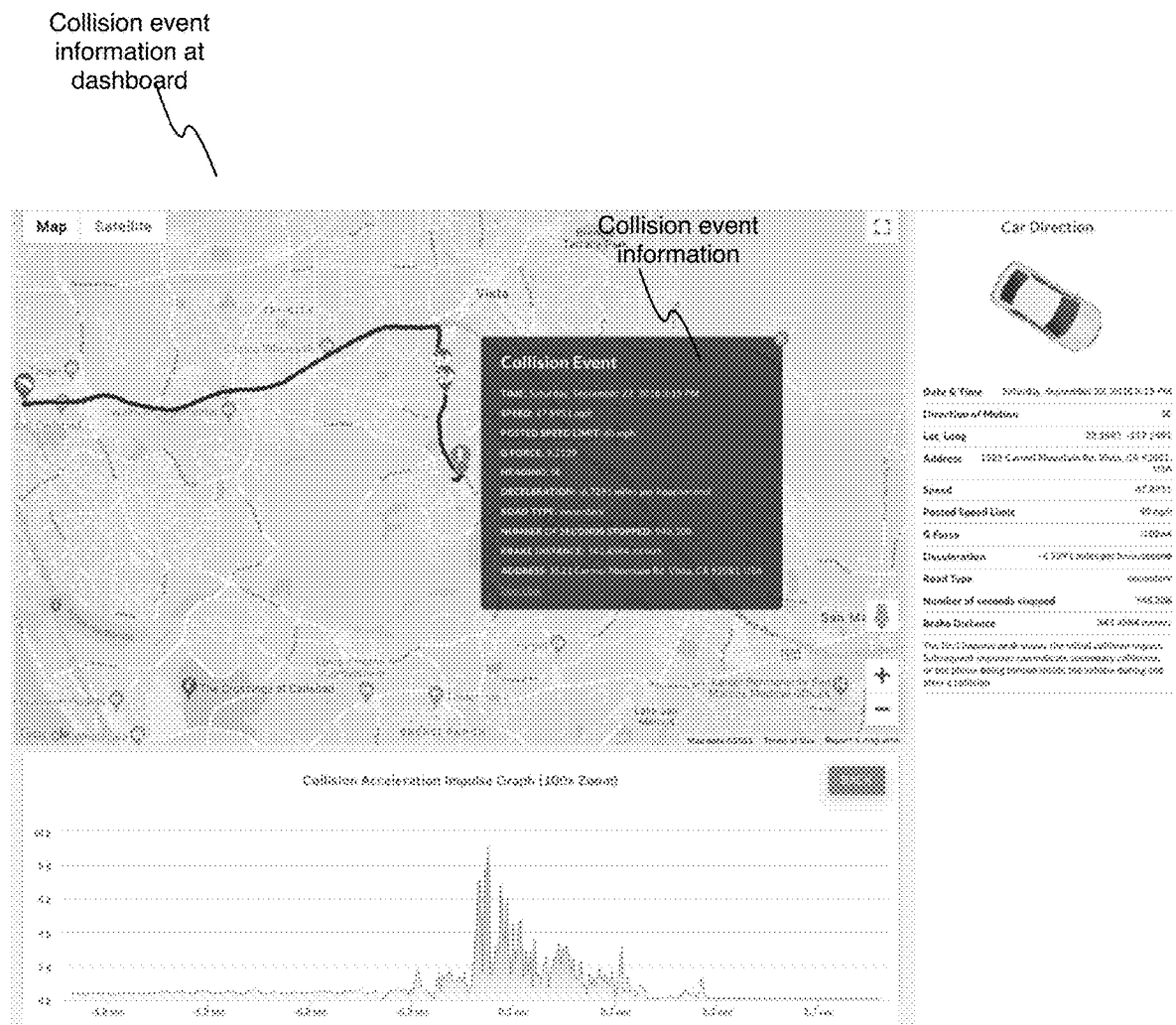
Figure 9F:
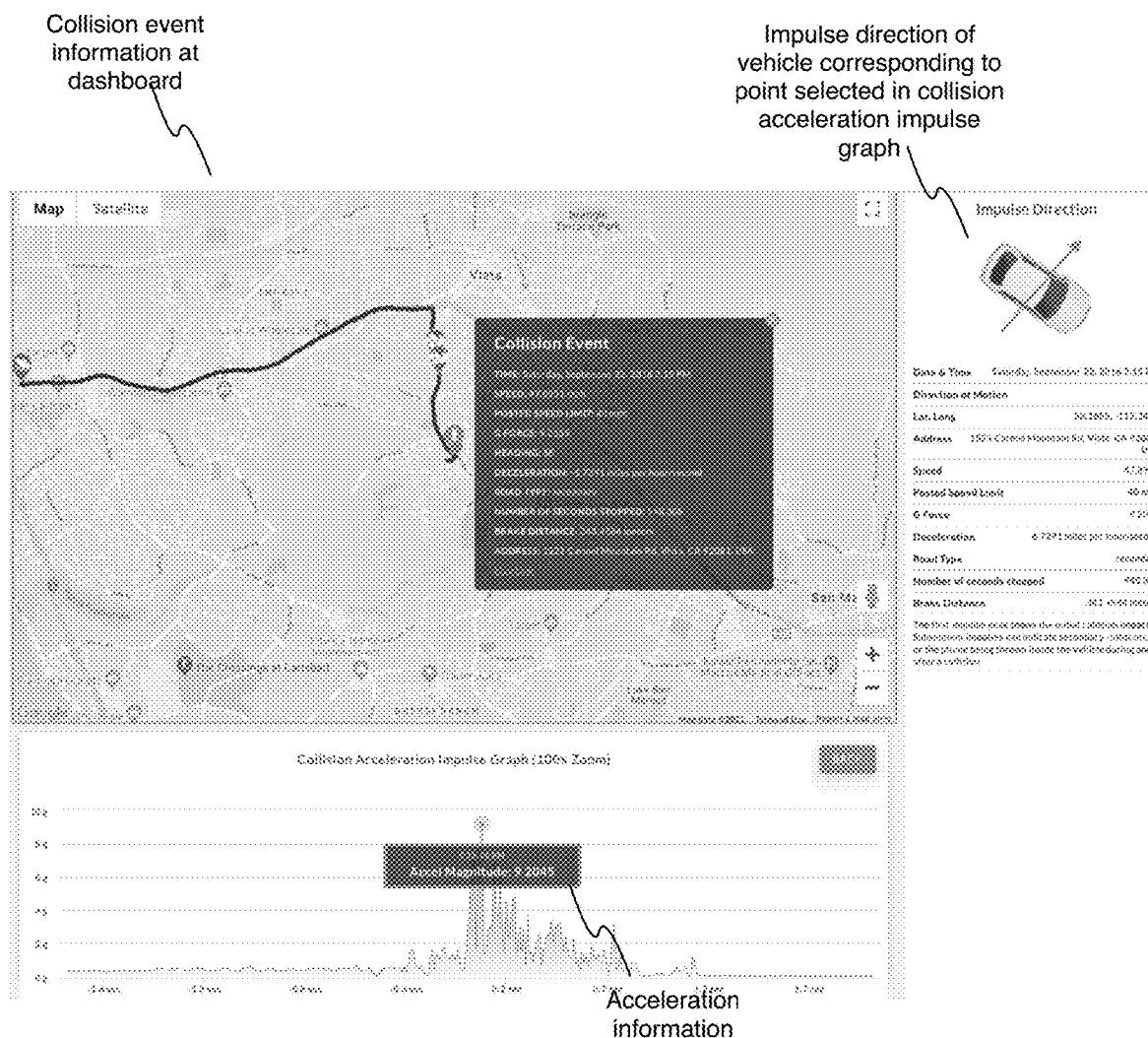

In some variations, the reconstruction output includes any or all of an insurance claim (e.g., as shown in FIG. 8B), wherein the method can include any or all of: triggering the creation of (e.g., initiating) a claim (e.g., in response to detecting a collision, in the form of an FNOL, etc.); updating a claim with additional information received, such as through repeated instances of S205 (e.g., subsequently identified locations and/or trips of the driver, follow-up with driver such as through notifications/messages and/or calls, etc.); accessing detailed collision information (e.g., collected in S205, determined throughout the method 200, etc.); producing a claim and/or claim recommendation based on any or all of the above; and/or any other suitable processes. In such variations, any or all of the information (e.g., collision information, historical driver data, etc.) in the method 200 can optionally be shared with an insurance entity, such as through any or all of: webhooks, APIs, and/or any other suitable processes and/or tools.

In a first set of examples of creating an insurance claim, the method includes automatically (e.g., zero touch/zero-click) and/or partially automatically (e.g., one touch) performing a claim registration process (e.g., as shown in FIG. 8A), which functions to automatically notify the driver's insurer that the driver was involved in a collision and/or to automatically create a claim in the insurer system. This can confer a benefit to the driver of not having to initiate this process himself or herself. This can also confer any number of benefits to claims adjusters (e.g., human claims adjusters, bots, etc.), such as, but not limited to, any or all of: enabling the claims adjuster to retrieve data associated with a driver (e.g., who has reported a claim) such as historical driving data (e.g., to be used for further analysis to identify a risk associated with the driver) and/or collision data; and/or any other benefits. Automatically notifying the insurer can optionally be performed with one or more third party applications and/or other third party tools (e.g., third party client applications executing on the user's mobile device and in communication with an SDK and/or application programming interface [API] collecting any or all of the inputs in S205) such as an insurance carrier application and/or tool configured to receive inputs from the system 100, the method 200, and/or from the user. In a particular specific example, the claim registration process is a one touch process in which the driver enters inputs (e.g., severity of collision input, choice or whether to report a claim or ignore it, etc.) into an insurance carrier application, wherein in response to the inputs, the insurance carrier application can optionally retrieve data associated with the collision and/or otherwise trigger a claim generation process. In another particular specific example, a third party tool can automatically retrieve data associated with the collision (e.g., from the SDK, from another client application, from storage, from a remote computing system and/or remote server, etc.), wherein the third party tool is responsible for creating the claim.

Figure 6A:
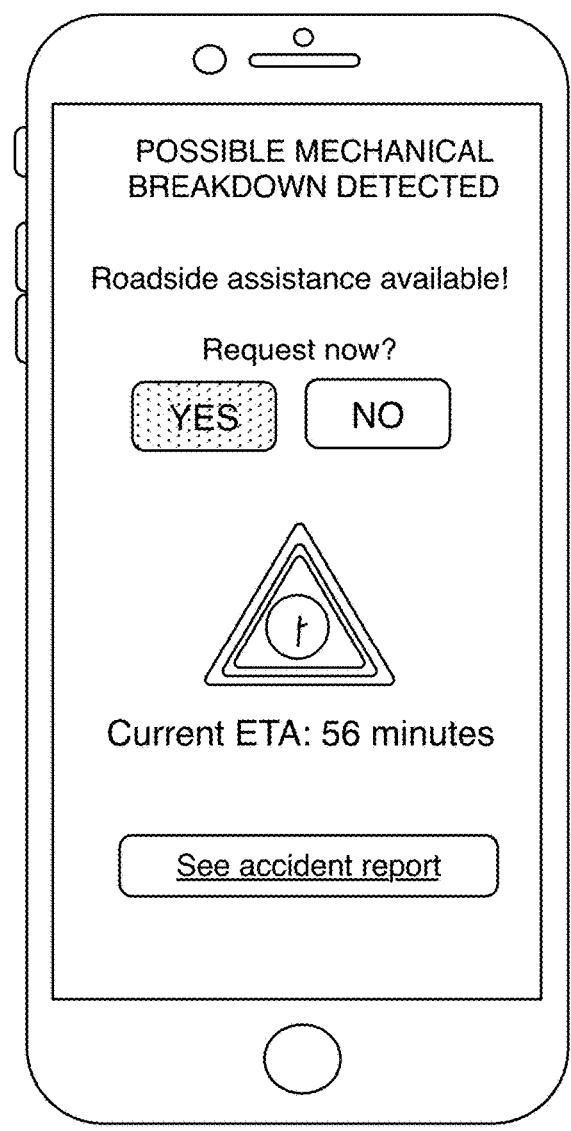
FIGS. 6A-6B depict examples of a notification presented to a driver at a mobile device of the driver.
Figure 6B:
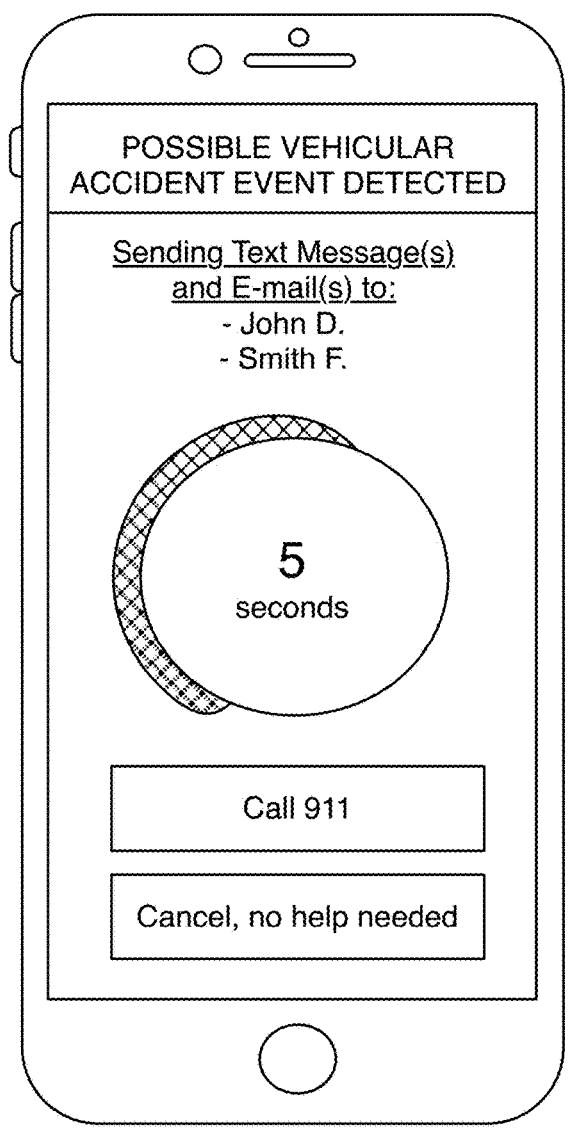
Figure 7A:
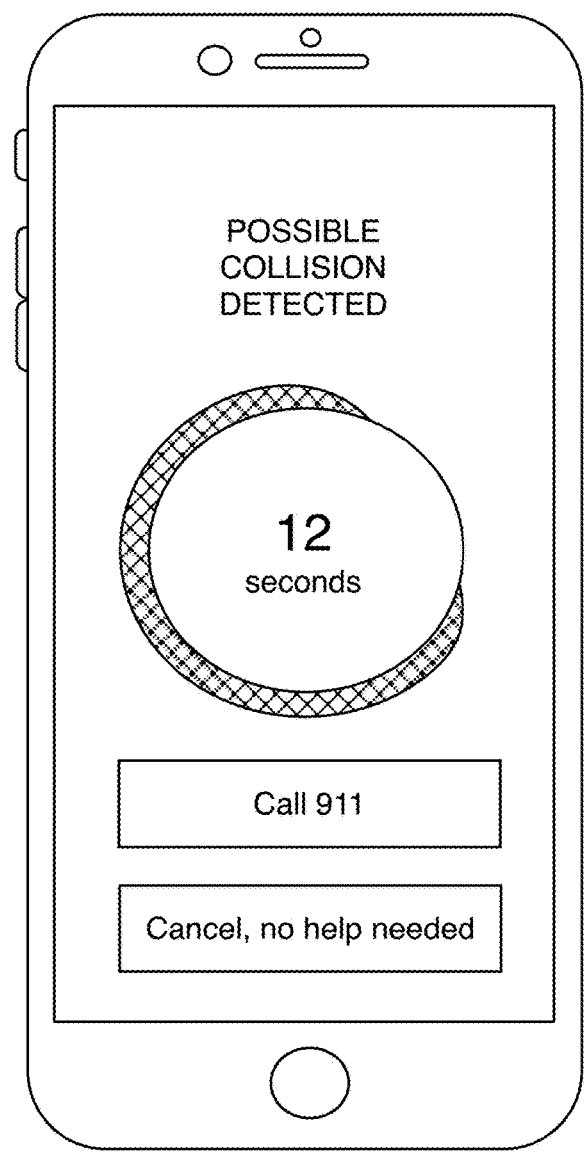
FIGS. 7A-7B depict examples of a notification presented to a driver at a mobile device of the driver.
Figure 7B:
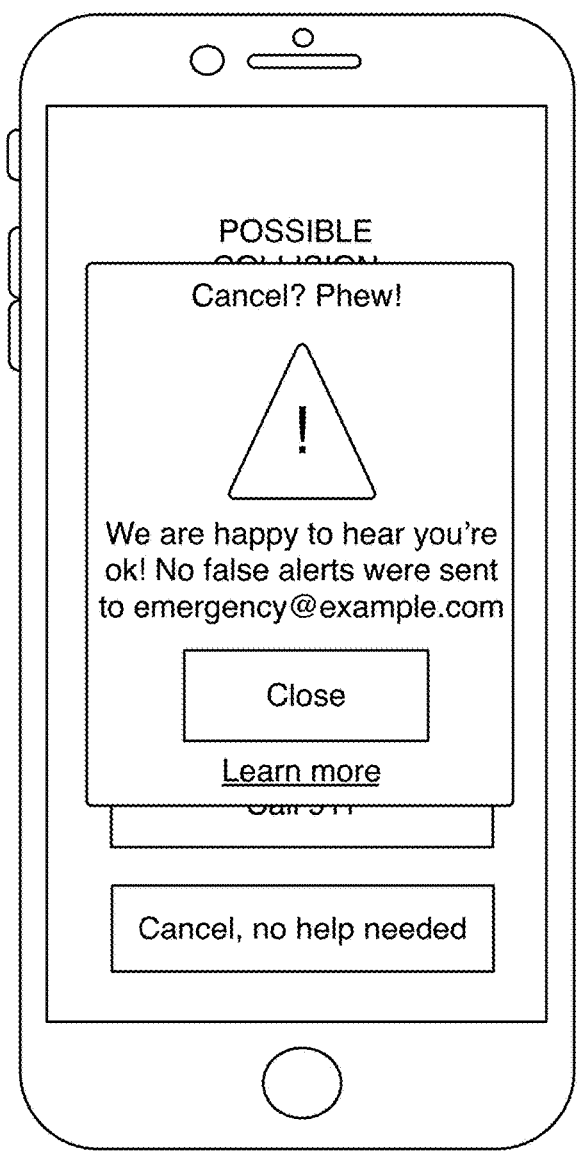

The reconstruction output can additionally or alternatively trigger one or more actions and/or responses, such as any or all of: the contacting of emergency assistance (e.g., police, ambulance, hospital dispatch, etc.); the contacting of the driver (e.g., through notifications as depicted in FIGS. 6A-6B, through notifications as depicted in FIGS. 7A-7B); the determination and/or adjustment of one or more insurance calculations and/or hypotheses (e.g., claims adjustment, determination of who is at fault, determination of damage extent of vehicle, initiating a FNOL report, etc.); and/or any other suitable actions and/or responses.

S230 can additionally or alternatively include determining (e.g., training) one or more models based on any or all of the outputs produced in the method, such as an insurance model (e.g., to automatically produce insurance outputs) and/or any other suitable models.

Additionally or alternatively, S230 can produce one or more insights (e.g., based on aggregated collision information) related to collisions, such as which factors contribute to (e.g., correlate with) collisions and/or how factors contribute to collisions, wherein the factors can include, for instance, any or all of: region in which the driver is driving (e.g., geographical region, road type, etc.), demographic information of driver (e.g., gender, age, size, etc.), vehicle information (e.g., vehicle make/model, vehicle size, etc.), and/or any other suitable information. In specific examples, for instance, data collected in the method indicating that a particular vehicle make/model has a particularly high incidence of frontal damage (e.g., due to side swiping other vehicles) can be used to determine that said vehicles have a particularly large blind spot.

S230 can additionally or alternatively be used to determine and/or update one or more scores associated with any or all of: a driver (e.g., through updating a driver risk score in an event of a collision), a road segment and/or road type, and/or any other suitable information. In some variations, for instance, S230 is used to update the risk score associated with particular road segments (equivalently referred to herein as route segments) associated with collisions (e.g., any collisions, collisions above a predetermined threshold, collisions above a predetermined threshold relative to number of miles driven on road segment, etc.). In specific examples, for instance, the risk associated with a route segment as determined in U.S. application Ser. No. 17/111, 299, filed 3 Dec. 2020, which is incorporated herein in its entirety by this reference, can be updated based on any or all of the outputs determined in the method 200.

In a first set of variations, S230 includes generating a presentation productized as a UI for a user and/or entity, such as an insurance firm, the driver, law enforcement personnel, and/or any other user or entity.

In a second set of variations, S230 includes generating a report as part of a service for a user or entity, such as an insurance firm, the driver, law enforcement personnel, and/or any other user or entity. In specific examples, S230 includes providing a report to a claims adjuster which functions to ensure that the claim is commensurate with the collision.

In a third set of variations, S230 includes triggering an emergency response based on the output of the confidence module in S220 and/or any or all of the other modules.

In a fourth set of variations, S230 includes triggering an emergency response based on the output of the collision detection algorithm in S210 and/or any or all of the other algorithms.

Additionally or alternatively, S230 can include any other suitable processes.

4.5 Method: Training One or More Models and/or Modules

Figure 5:
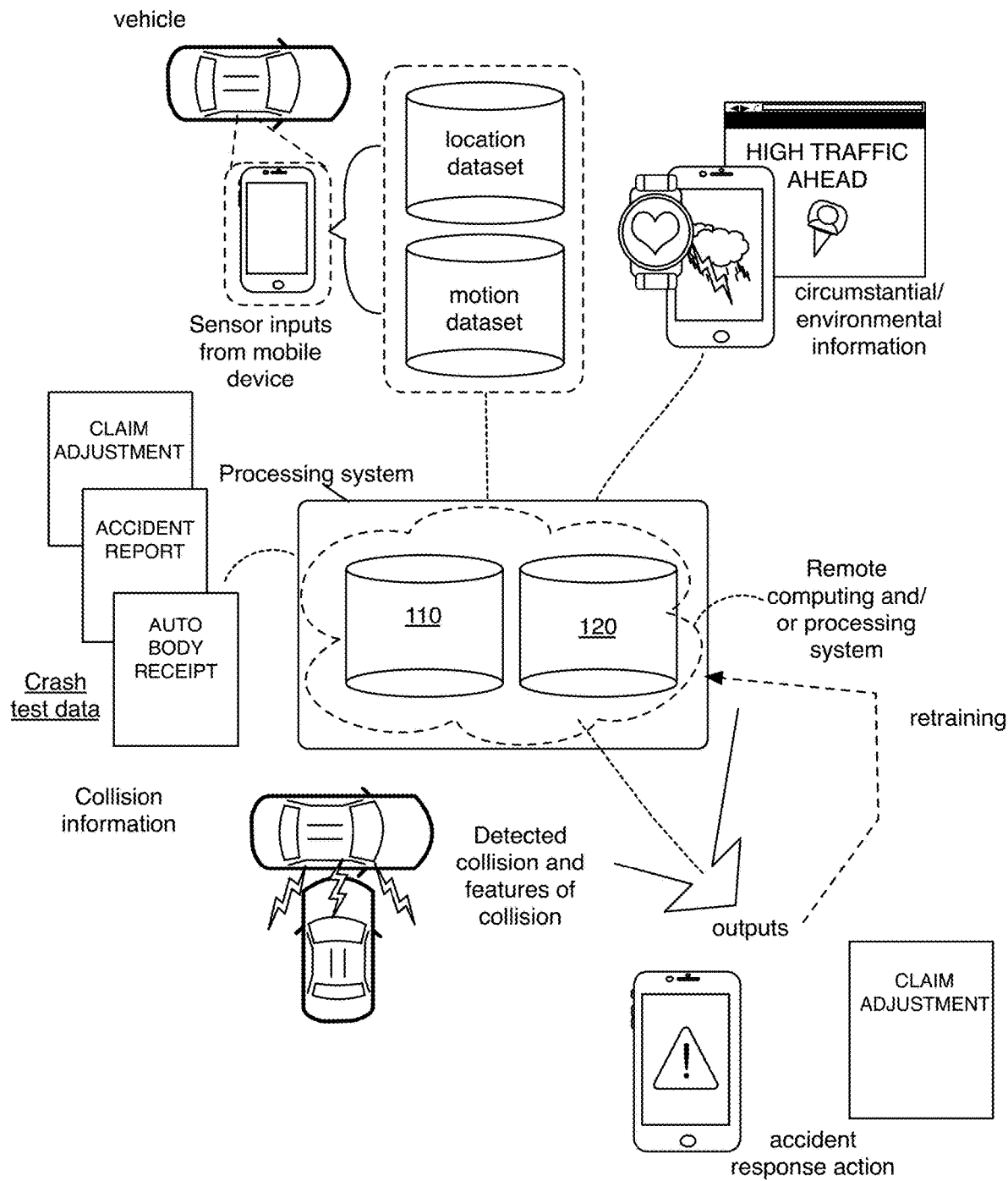
FIG. 5 is a schematic representation of the system for accident detection and/or reconstruction.

The method 200 can optionally include training any or all of the models and/or modules described above (e.g., as shown in FIG. 5), which can function to enable full or partial automation of any or all of the models and modules, improve the performance of any or all of the models and modules, enable any or all of the models and modules to continue to learn based on new and/or continuously collected data, and/or can perform any other suitable functions.

The training can be performed at any or all of: prior to S205, prior to S210, prior to S220, prior to S230, after S230 (e.g., as part of a retraining and/or updating of any or all of the modules and/or models), and/or at any other suitable times. Additionally or alternatively, training can occur multiple times during the method and/or the method can be performed in absence of training and/or retraining.

In some variations, a first training of one or more models and/or modules is performed prior to the method 200, wherein any or all of the trained models and/or modules is updated (retrained) based on the information collected in the method 200 and any or all of the outputs determined based on the information.

The information used to train the models and/or modules preferably includes historical data collected from previous drivers, such as any or all of the set of inputs collected in S205. The historical preferably includes at least sensor data collected from the drivers, further preferably at mobile devices (e.g., smartphones) associated with the drivers, and optionally any or all outputs indicating whether or not a collision occurred (e.g., outputs produced in S230, model outputs, module outputs, etc.) such as any or all of those described in the method (e.g., location and/or behavior information of the drivers post collision, driver confirmation in response to sending the driver a notification, etc.) and/or any other suitable data (e.g., from contacting drivers after collision for follow-up, from receiving confirmation from drivers regarding a potential collision, from insurance reports, from police reports, from auto body shop receipts, from interviews with any entities, etc.).

The information used to train any or all of the models and/or modules can additionally or alternatively include crash test data (e.g., to correlate sensor data with different types of collisions and/or collision features such as severity and/or direction of impact, etc.), data from one or more OBD ports of the vehicle and/or from one or more OEM components (e.g., during crash tests, on the road, etc.), and/or any other suitable information.

The training can additionally or alternatively include any number of human-in-the-loop analyses (e.g., during supervised learning), which can function, for instance, to implement human knowledge and/or other outside information—such as any or all of: police reports generated after accidents, insurance claims generated after accidents, auto body information generated after accidents, fraud characteristics, and/or any other suitable information—to train for accurate and useful classifications.

Additionally or alternatively, the training can include any other suitable processes.

4.6 Variations

In a first variation of the method 200, the method includes: collecting information S205 from a set of one or more mobile devices (e.g., via an SDK), wherein the information is collected continuously at least while the vehicle is driving, and wherein the information includes at least motion information (e.g., speed, acceleration, etc.) and location information (e.g., GPS coordinates, route information, etc.) and optionally driver information (e.g., risk score, historical driving performance, mobile device usage, etc.) and/or circumstantial/environmental information (e.g., as shown in FIG. 5); detecting a collision and/or one or more collision features with a collision model based on the information; reconstructing the collision with a set of modules S220, wherein a subset of modules is optionally selected based on the results of the collision model; and producing an output based on the reconstructed collision, wherein the output can include any or all of: a presentation and/or report summarizing key features of the accident which can provide actionable insight regarding the accident, an action (e.g., triggering an emergency response, transmitting a notification to the driver, etc.), a communication, and/or any other suitable outputs. Additionally or alternatively, the method 200 can include any other suitable processes (e.g., training any or all of the models and modules, retraining any or all of the models and modules, etc.).

In a first specific example, the collision model includes a set of classifier algorithms, wherein the set of classifier algorithms can include any or all of: a collision detection algorithm, a severity detection algorithm, a direction of impact algorithm, and/or any other suitable algorithms, and wherein the set of modules includes a combination of machine learning and classical modules, wherein the set of modules can include any or all of: a confidence module, a fraud module, a direction of impact module, and a severity module. The classifier algorithms preferably implement a combination of traditional machine learning (e.g., gradient boosting machines) and deep learning, and the machine learning modules preferably implement regression learning, but the models and/or modules can additionally or alternatively implement any other suitable models.

In a second variation of the method 200, the method includes: collecting information S205 from a set of one or more mobile devices (e.g., via an SDK), wherein the information is collected continuously at least while the vehicle is driving, and wherein the information includes at least motion information (e.g., speed, acceleration, etc.) and location information (e.g., GPS coordinates, route information, etc.) and optionally driver information (e.g., risk score, historical driving performance, mobile device usage, etc.) and/or circumstantial/environmental information; detecting a collision and reconstructing the collision based on one or both of a collision model and/or set of modules; and producing an output based on the reconstructed collision, wherein the output can include any or all of: a presentation and/or report summarizing key features of the accident which can provide actionable insight regarding the accident, an action (e.g., triggering an emergency response, transmitting a notification to the driver, etc.), a communication, and/or any other suitable outputs. Additionally or alternatively, the method 200 can include any other suitable processes (e.g., training any or all of the models and modules, retraining any or all of the models and modules, etc.).

In a third variation of the method 200, the method includes: collecting information S205 from onboard a vehicle (e.g., from sensors mounted to the vehicle, from an OBD port of the vehicle) and optionally from a set of one or more mobile devices (e.g., via an SDK), wherein the information is collected continuously at least while the vehicle is driving, and wherein the information includes at least motion information (e.g., speed, acceleration, etc.) and location information (e.g., GPS coordinates, route information, etc.) and optionally driver information (e.g., risk score, historical driving performance, mobile device usage, etc.) and/or circumstantial/environmental information; detecting a collision and/or one or more collision features with a collision model based on the information; reconstructing the collision with a set of modules S220, wherein a subset of modules is optionally selected based on the results of the collision model; and producing an output based on the reconstructed collision, wherein the output can include any or all of: a presentation and/or report summarizing key features of the accident which can provide actionable insight regarding the accident, an action (e.g., triggering an emergency response, transmitting a notification to the driver, etc.), a communication, and/or any other suitable outputs. Additionally or alternatively, the method 200 can include any other suitable processes (e.g., training any or all of the models and modules, retraining any or all of the models and modules, etc.).

Additionally or alternatively, the method 200 can include any other suitable processes performed in any suitable order.

Although omitted for conciseness, the preferred embodiments include every combination and permutation of the various system components and the various method processes, wherein the method processes can be performed in any suitable order, sequentially or concurrently.

As a person skilled in the art will recognize from the previous detailed description and from the figures and claims, modifications and changes can be made to the preferred embodiments of the invention without departing from the scope of this invention defined in the following claims.

We claim:

1. A method for collision detection and reconstruction, the method comprising:
at a remote computing system in communication with a mobile device associated with a driver, wherein the driver is arranged within a vehicle, receiving a set of inputs, wherein the set of inputs comprises:
a location dataset collected at a location sensor of the mobile device;
a motion dataset collected at a motion sensor the mobile device;
a pressure dataset collected at a pressure sensor of the mobile device;
processing the set of inputs with a model, wherein the model is a machine learning model, wherein at least a portion of the machine learning model is a deep learning model, wherein the model comprises a set of algorithms configured to produce a set of probabilistic outputs, the set of algorithms comprising:
a collision detection algorithm configured to produce a collision parameter;
a severity detection algorithm configured to produce a severity parameter; and
a direction of impact detection algorithm configured to produce a direction of impact parameter;
processing a set of modules based on the set of probabilistic outputs to determine a set of module outputs, wherein the set of modules comprises:
a confidence module;
a fraud module;
a direction of impact module; and
a severity module;
implementing an emergency response based on at least one of the collision detection algorithm and the confidence module;
providing a subset of module outputs to an insurance entity, wherein the subset of module outputs comprises outputs from at least one of the fraud module, the direction of impact module, and the severity module; and
updating at least one of the set of algorithms and the set of modules based on the set of module outputs;
further comprising determining a collision risk score associated with a road segment based on at least one of the set of module outputs, wherein the road segment is arranged proximal to the location of the collision.

2. The method of claim 1, further comprising processing the collision detection algorithm multiple times.

3. The method of claim 2, wherein each of the severity detection algorithm and the direction of impact detection algorithm is performed a single time.

4. The method of claim 1, wherein a first subset of the set of modules comprises machine learning models and wherein a second subset of the set of modules comprises classical rule-based models.

5. The method of claim 4, wherein the second subset comprises the fraud module.

6. The method of claim 1, further comprising:
receiving a second set of inputs associated with a second driver; and
processing the second set of inputs with an updated set of algorithms, the updated set of algorithms determined based on the first driver.

7. The method of claim 1, wherein a second portion of the model implements traditional machine learning.

8. The method of claim 7, wherein the traditional machine learning comprises a gradient boosting machine.

9. The method of claim 1, wherein the model is further configured to produce as outputs a set of auxiliary outputs, wherein the set of auxiliary outputs comprises a set of gravitational force equivalent values and a speed of the vehicle just before the collision.

* * * * *